US008310694B2

(12) United States Patent
Maki

(10) Patent No.: US 8,310,694 B2
(45) Date of Patent: Nov. 13, 2012

(54) INFORMATION PROCESSING APPARATUS AND CONTROL METHOD THEREOF

(75) Inventor: Nobuhiko Maki, Tokyo (JP)

(73) Assignee: Canon Kabushiki Kaisha (JP)

( * ) Notice: Subject to any disclaimer, the term of this patent is extended or adjusted under 35 U.S.C. 154(b) by 1143 days.

(21) Appl. No.: 11/670,451

(22) Filed: Feb. 2, 2007

(65) Prior Publication Data

US 2007/0180245 A1 Aug. 2, 2007

(30) Foreign Application Priority Data

Feb. 2, 2006 (JP) .................................. 2006-026179

(51) Int. Cl.
*G06F 3/12* (2006.01)
*G06F 21/00* (2006.01)
*G06K 15/00* (2006.01)
*H04L 9/32* (2006.01)
*H04L 29/06* (2006.01)

(52) U.S. Cl. ...................... 358/1.15; 358/1.16; 358/1.13; 358/1.14; 358/1.1; 713/184; 713/186; 713/169; 713/167; 713/163

(58) Field of Classification Search ........ 726/4; 713/186, 713/169; 725/32; 709/202; 358/400
See application file for complete search history.

(56) References Cited

U.S. PATENT DOCUMENTS

| 6,636,903 | B2 * | 10/2003 | Endoh et al. ................. 710/8 |
| 7,260,720 | B2 * | 8/2007 | Yamamoto et al. ........... 713/169 |
| 7,298,508 | B2 * | 11/2007 | Furukawa et al. ........... 358/1.15 |
| 7,307,746 | B2 * | 12/2007 | Inoue ........................ 358/1.15 |
| 7,523,488 | B2 * | 4/2009 | Chavis et al. ................. 726/4 |
| 7,589,857 | B2 * | 9/2009 | Oe .......................... 358/1.16 |
| 7,613,919 | B2 * | 11/2009 | Bagley ....................... 713/155 |
| 2001/0027439 | A1 * | 10/2001 | Holtzman et al. ............. 705/39 |
| 2002/0152261 | A1 * | 10/2002 | Arkin et al. ................. 709/225 |
| 2003/0137693 | A1 * | 7/2003 | Nishio ....................... 358/1.15 |
| 2004/0098320 | A1 * | 5/2004 | Mitsuhashi et al. ........... 705/27 |
| 2004/0111747 | A1 * | 6/2004 | Omoigui ....................... 725/58 |
| 2005/0108747 | A1 * | 5/2005 | Omoigui ....................... 725/32 |
| 2005/0210267 | A1 * | 9/2005 | Sugano et al. ................ 713/186 |
| 2005/0289641 | A1 * | 12/2005 | Miura et al. .................. 726/4 |
| 2006/0143453 | A1 * | 6/2006 | Imamoto et al. ............. 713/169 |
| 2006/0173846 | A1 * | 8/2006 | Omae et al. .................. 707/9 |
| 2008/0320471 | A1 * | 12/2008 | Maeda ...................... 717/178 |

FOREIGN PATENT DOCUMENTS

| JP | 2000-244694 A | 9/2000 |
| JP | 2001-175602 A | 6/2001 |
| JP | 2001-282667 A | 10/2001 |
| JP | 2005-165976 A | 6/2005 |

OTHER PUBLICATIONS

Office Action issued in corresponding Japanese Patent Application No. 2006-026179 dated Jan. 21, 2011.

* cited by examiner

*Primary Examiner* — Akwasi M Sarpong
(74) *Attorney, Agent, or Firm* — Rossi, Kimms & McDowell LLP

(57) ABSTRACT

An information processing apparatus for communicating with an external apparatus via a network is provided that includes a generating unit for generating identification information capable of specifying a service in order to launch the service, a receiving unit for receiving input information input by a user with the external apparatus from the external apparatus via the network, a judging unit for judging whether or not the input information received by the receiving unit corresponds to the identification information generated by the generating unit, and a notifying unit for notifying the external apparatus of address information indicating an address of the information processing apparatus if the judging unit judges that the input information corresponds to the identification information.

13 Claims, 27 Drawing Sheets

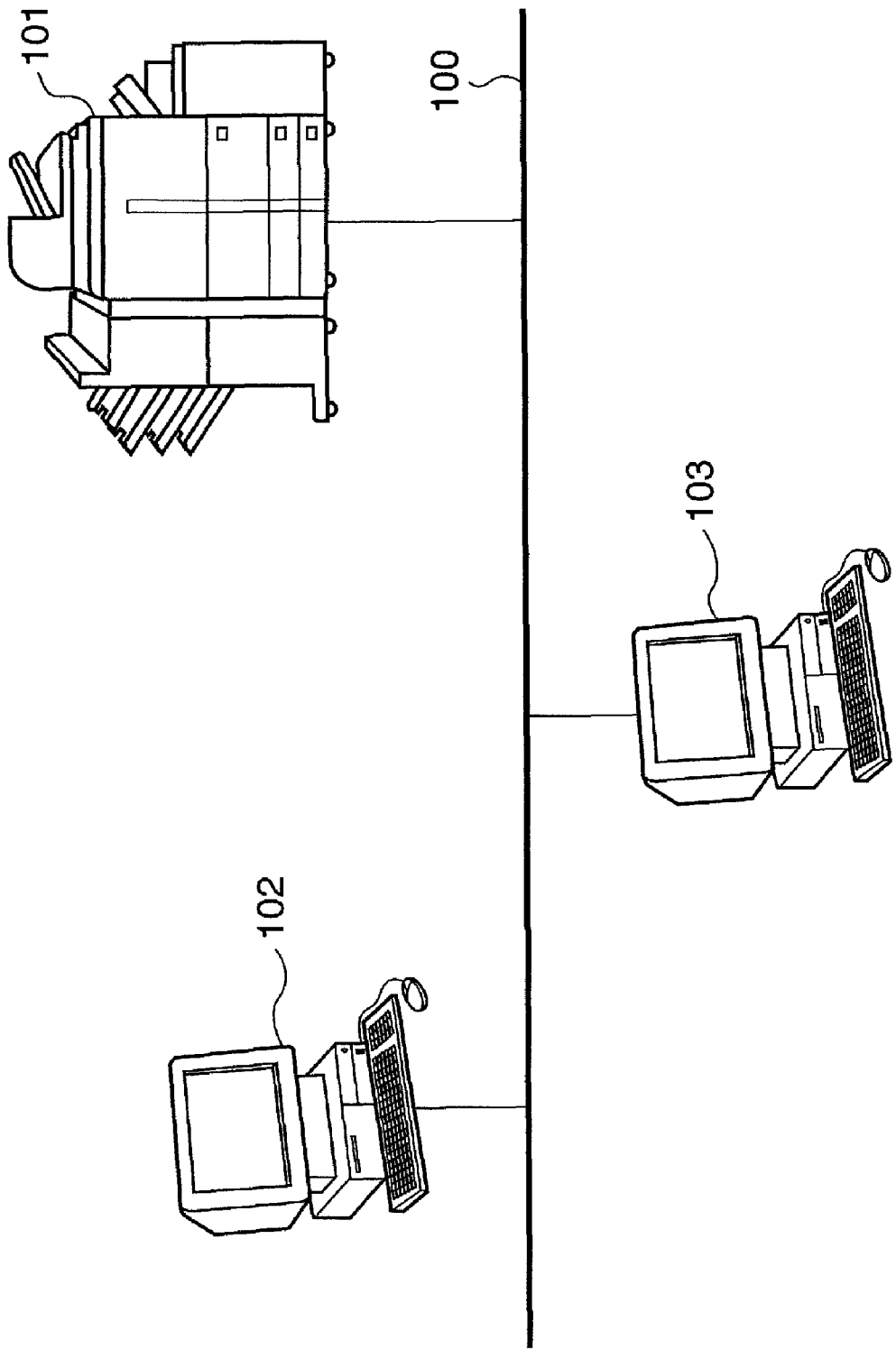

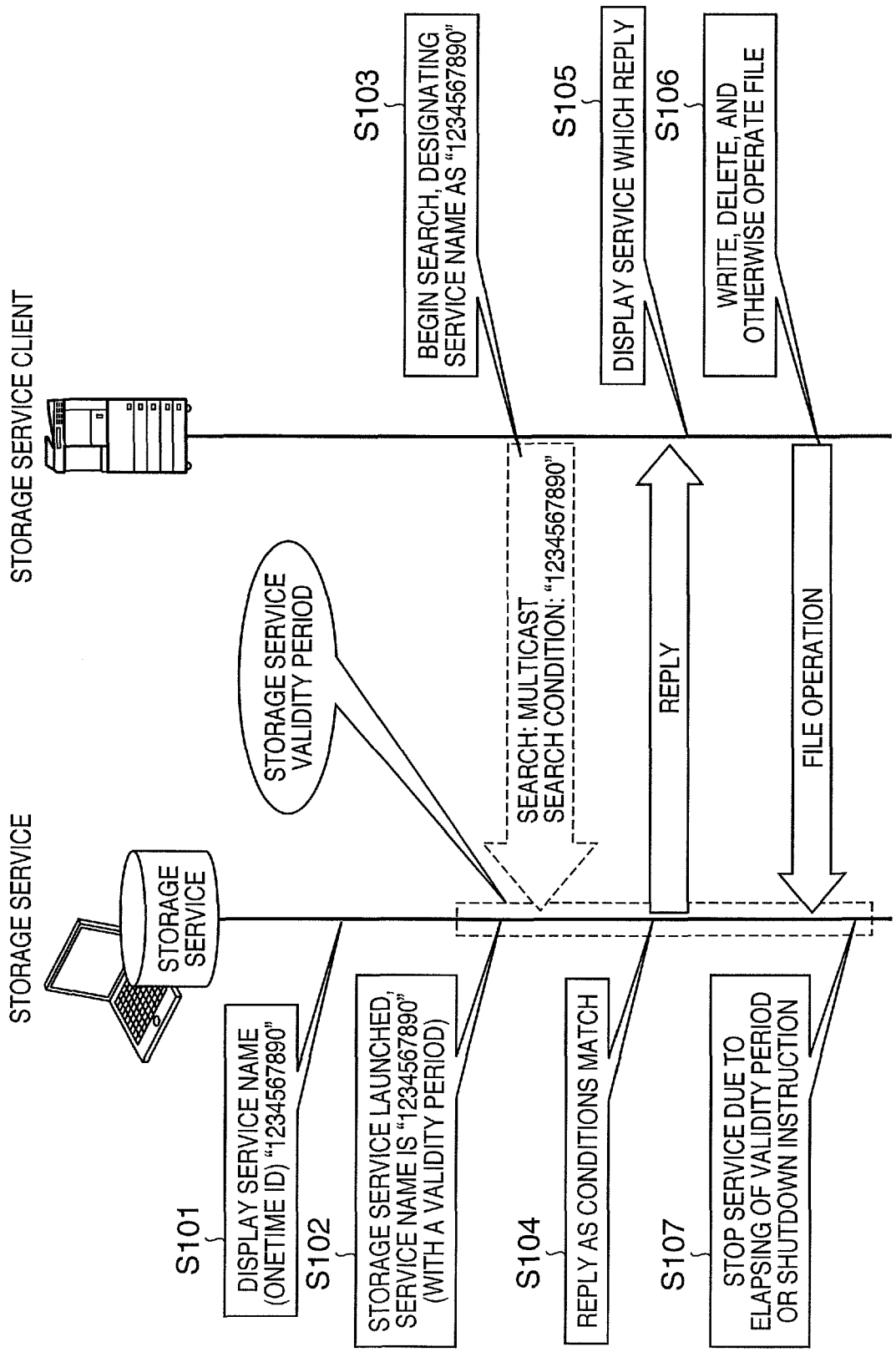

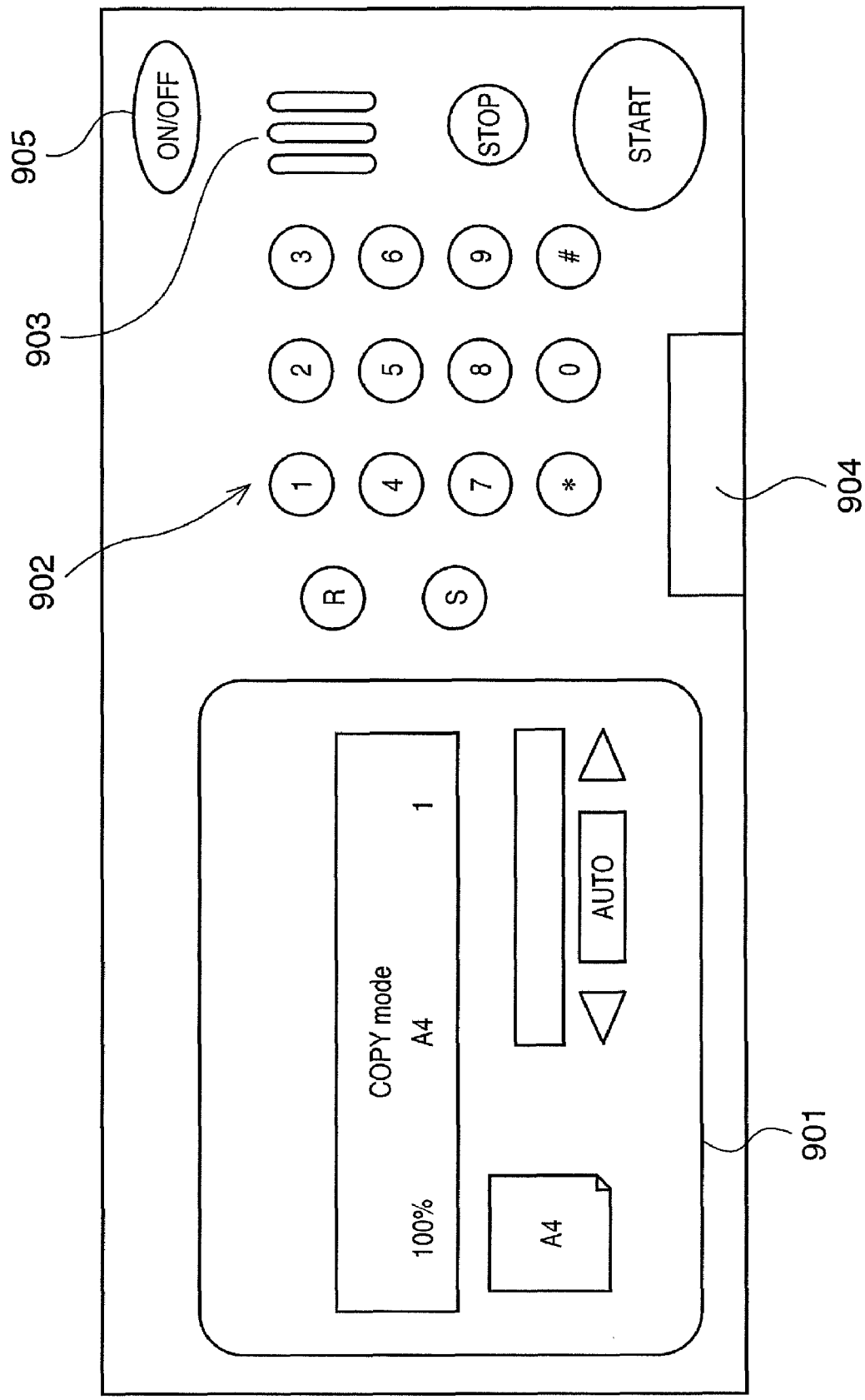

F I G. 12
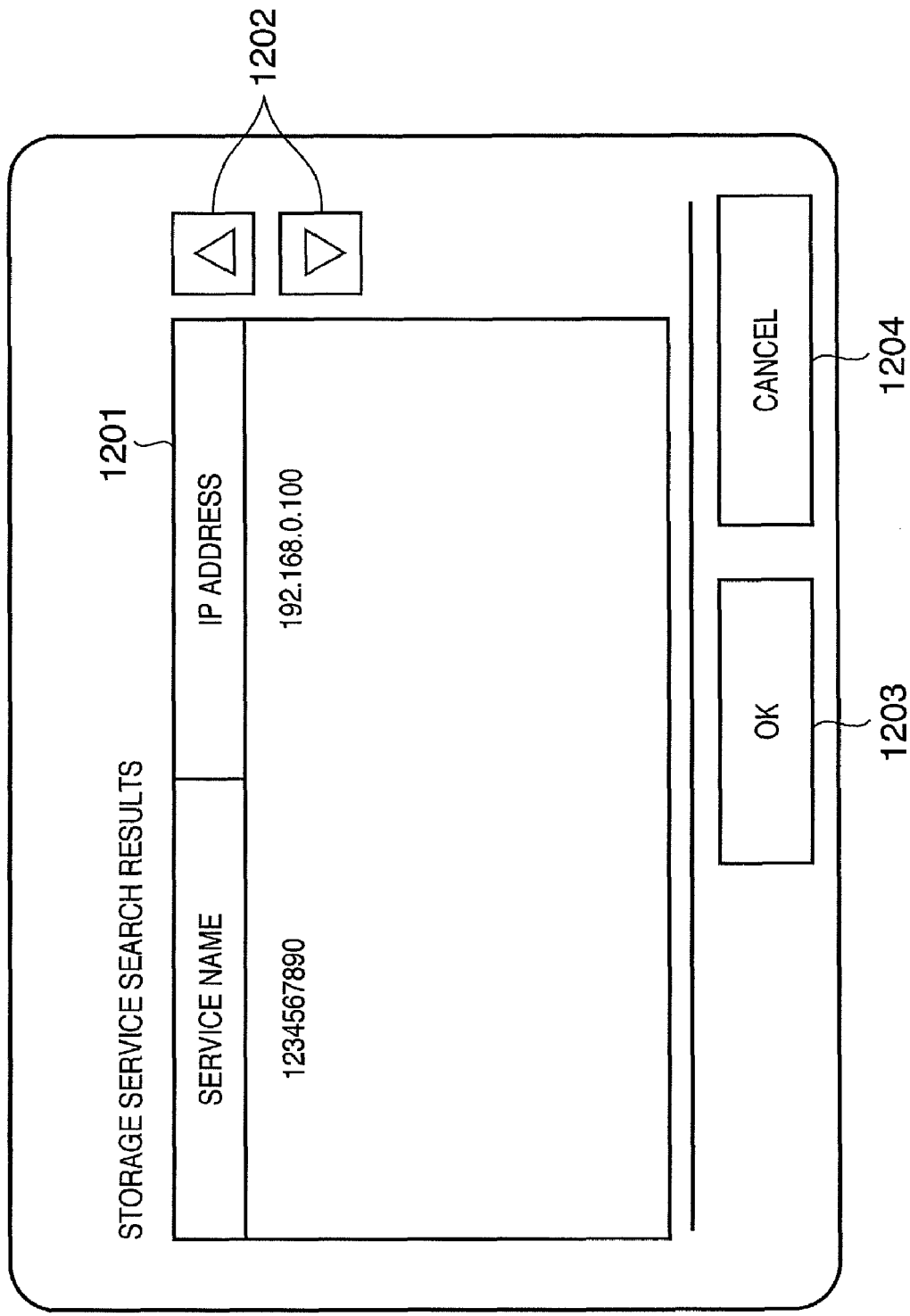

INFORMATION PROCESSING APPARATUS AND CONTROL METHOD THEREOF

BACKGROUND OF THE INVENTION

1. Field of the Invention

The present invention relates to information processing apparatuses and control methods thereof, in particular communication technologies used in information processing apparatus which communicate with external apparatuses via networks.

2. Description of the Related Art

A service for transferring data scanned from a device to a computer (hereafter "PC") is known. With such service, a user can read a physical document into the user's own PC as an electronic document.

In order to use this kind of service, it is necessary for the user to connect a PC to a network and then perform a process of transferring data scanned to the user's own PC from the device. At this time, the user inputs the PC's IP address or authentication information from the device in order to specify that the PC which is the transfer destination is the user's own PC. See, for example, JP 2000-244694 A.

The need also arises of searching for the user's own PC from the device. For example, when searching for a PC on a network from the device, the user needs to specify the user's own PC from among a large number of PCs connected to the network. If a problem occurs during this search, there is the possibility that the data might be transferred to another PC accidentally.

On the other hand, in the case of a method in which the user inputs the IP address of the PC into the device, it is necessary for the user to know the IP address of the user's own PC. In this case, the need arises for the user to exercise caution regarding the IP address allocated each time in a public network environment. In other words, in a network environment, the IP address of the PC may change dynamically. For example, there are cases in which the PC requests an IP address from the server every time it launches, and then uses the IP address issued by the server as its own address. In this case, the server dynamically allocates an IP address currently unused on the network to the PC. In this situation, the possibility cannot be brushed aside of the user making a mistake in inputting the IP address, and thereby causing the device to mistakenly transmit the data to another PC.

The following kinds of problems have arisen when transferring scanned data, etc., from a device to a PC connected temporarily to a network in a public place. The first problem is the hassle arising in the inputting operation of the IP address of the PC which is the destination for the scanned data. The second problem is mistakenly transferring the data to another PC.

For example, if a malicious third party connects a PC to a network and that PC always returns an authentication confirmation to the device for authentication of users from the device, there is a possibility that scanned data might be read into the malicious third party's PC. When this happens, there is a possibility that the authentication information might be received by the malicious third party's PC.

SUMMARY OF THE INVENTION

The present invention has been achieved to solve these problems, and provides an information processing apparatus and a control method thereof, wherein a user can appropriately select a specific service and use that service via a network.

In order to solve these problems, the information processing apparatus of the present invention is an information processing apparatus for communicating with an external apparatus via a network, comprising a generating unit for generating identification information capable of specifying a service in order to launch the service, a receiving unit for receiving input information input by a user with the external apparatus from the external apparatus via the network, a judging unit for judging whether or not the input information received by the receiving unit corresponds to the identification information generated by the generating unit, and a notifying unit for notifying the external apparatus of address information indicating an address of the information processing apparatus if the judging unit judges that the input information corresponds to the identification information. The identification information is valid for a predetermined time from the service being launched, and further a stopping unit is provided for stopping the service when the predetermined time elapses. The judging unit includes a unit for generating identification information from the input information in accordance with a generating procedure of the generating unit.

The information processing apparatus of the present invention is an information processing apparatus for communicating with a plurality of external apparatuses via a network, comprising a transmitting unit for transmitting input information input by a user to a plurality of external apparatuses via the network, a receiving unit for receiving a reply indicating that the input information transmitted by the transmitting unit corresponds to identification information capable of specifying a service launched by an external apparatus, and an obtaining unit for obtaining address information indicating an address of the external apparatus from the reply.

Here, the identification information is a random value computed from information identifying the information processing apparatus, information identifying the user who caused the service to be launched, or information including a time at which the service is launched. The input information is the identification information. Further, the input information is information identifying the information processing apparatus, information identifying the user who caused the service to be launched, or information including a time at which the service is launched. The service is a storage service for storing document files. Further, the service is a scan service for reading document files.

Further, the control method for the information processing apparatus of the present invention is a control method for an information processing apparatus for communicating with a plurality of external apparatuses via a network, comprising a generating step of generating identification information capable of specifying a service in order to launch the service, a receiving step of receiving input information input by a user with the external apparatus from the external apparatus via the network, a judging step of judging whether or not the input information received in the receiving step corresponds to the identification information generated in the generating step, and a notifying step of notifying the external apparatus of address information indicating an address of the information processing apparatus if it is judged in the judging step that the input information corresponds to the identification information.

Further, the control method for the information processing apparatus of the present invention is a control method for an information processing apparatus for communicating with a plurality of external apparatuses via a network, comprising a transmitting step of transmitting input information input by a user to a plurality of external apparatuses via the network, a receiving step of receiving a reply indicating that the input information transmitted in the transmitting step corresponds to identification information capable of specifying a service launched by an external apparatus, and an obtaining step of obtaining address information indicating an address of the external apparatus from the reply.

Moreover, a program for realizing this control method and capable of being executed on a computer and a storage medium for storing the program in a format capable of being read by a computer are provided.

Further, the method of the present invention is a communication method performed by a plurality of information processing apparatuses for communicating via a network, comprising a generating step of generating identification information capable of specifying a service in order to launch the service in a first information processing apparatus, a transmitting step of transmitting input information input by a user with a second information processing apparatus from the second information processing apparatus to the first information processing apparatus, a replying step of returning a reply from the first information processing apparatus to the second information processing apparatus indicating that the input information corresponds to the identification information, and an obtaining step of the second information processing apparatus obtaining from the reply address information indicating an address of the first information processing apparatus. The input information is the identification information. A step of generating the identification information from the input information in accordance with a generating procedure of the generating step is also provided.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram showing one example of a network of the present embodiment in which a PC on which a network storage service is operating and a multifunction device having a network connecting function are connected to a LAN.

FIG. 2 is an operational flowchart showing the flow from a launch of a storage service through a search through the storage service, a display of search results, operation of a file, and stopping the storage service in a first embodiment.

FIG. 9 is a view showing an example of a user interface unit provided to the multifunction device in the present embodiment.

FIG. 12 is a view showing an example of a display window for storage service search results displayed to the touch panel on the multifunction device in the first embodiment.

DESCRIPTION OF THE EMBODIMENTS

Figure 3A:
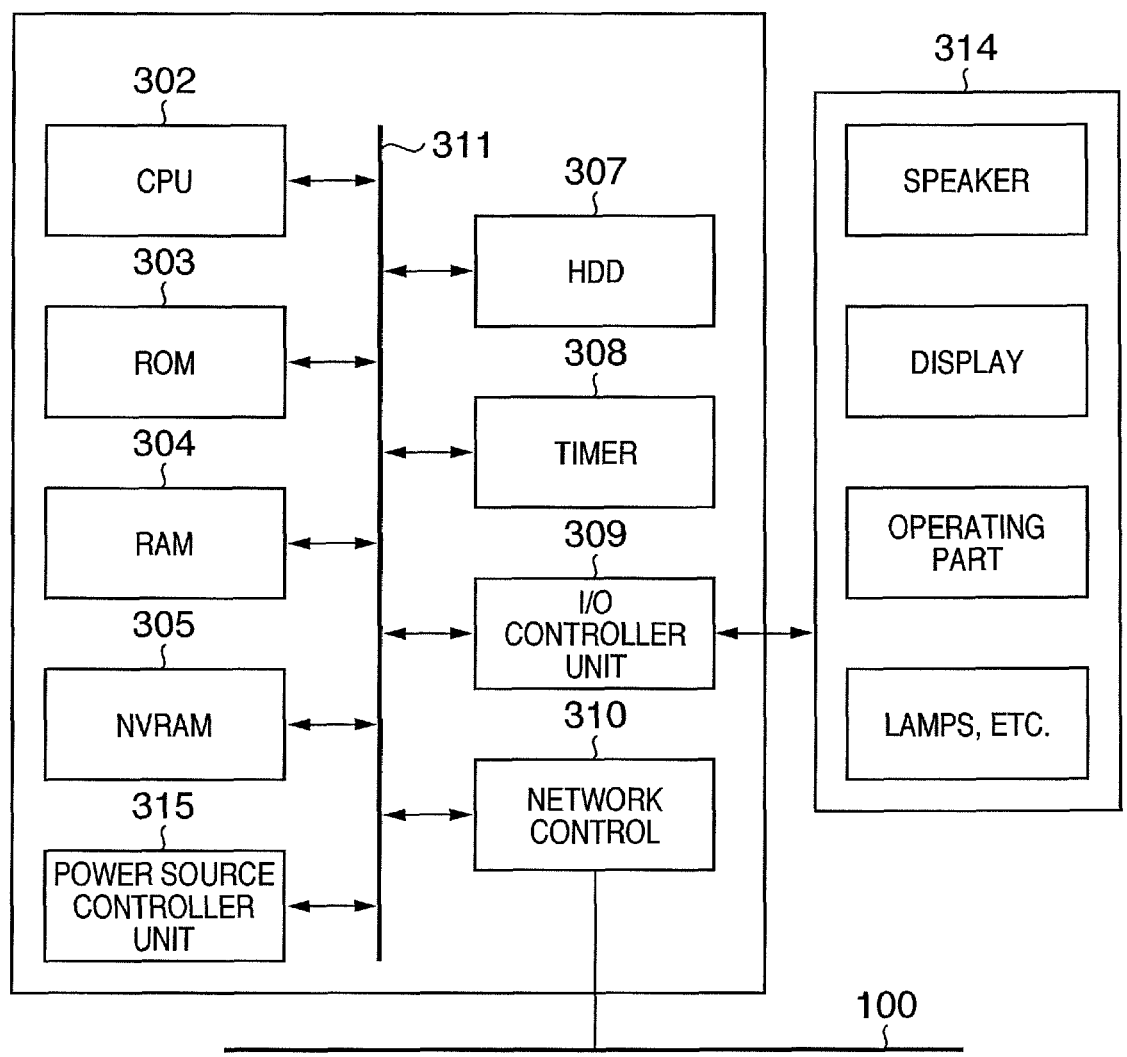
FIG. 3A is a block diagram showing a schematic configuration example of a PC in the present embodiment.

A detailed description will be given of embodiments of the present invention with reference to the attached drawings.

Example of Constitution of a Network System of the Present Embodiment

FIG. 1 is a diagram showing a schematic constitution of a network of the present embodiment in which a PC on which a network storage service is operating and a multifunction device having a network connecting function are connected to a LAN. Note that although in FIG. 1 an example of a system connected by a LAN is shown, any system, including the internet or other public networks, has the same constitution and effect as those of the present invention, and are contained in the present invention. Furthermore, there is no limit whatsoever on the devices which are connected or the number thereof.

In FIG. 1, 101 is a multifunction device capable of connecting to a LAN, and provides a network printing service or a scan service via a local area network (LAN) 100. Moreover, the multifunction device 101 is provided with a function for transmitting files to a storage service on other terminals on the network. A PC 102 and PC 103, which have a network storage service, are connected via the LAN 100 to the same network. The PC 102 and the PC 103 are PCs for receiving data read by the scan service from the multifunction device 101.

In a first embodiment, the network storage service is launched using a service name temporarily generated by the PC 102 (onetime ID: identification information capable of specifying a service or an apparatus providing a service). With the multifunction device 101, the storage service on the specified PC 102 is accurately searched for by performing a search for the storage service with the service name. Through the search results, a scanned document is passed without fail from the scan service of the multifunction device 101 to the storage service of the PC 102.

In a second embodiment, the network scan service is launched using a service name temporarily generated by a multifunction device 101 (onetime ID: identification information capable of specifying a service or an apparatus providing a service). With the PC 102, the scan service on the specified multifunction device 101 is accurately searched for by performing a search for the scan service with the service name when launching the storage service. Through the search results, a scanned document is passed without fail from the scan service of the multifunction device 101 to the storage service of the PC 102.

The examples of the first and second embodiments are examples of systems and the operation thereof which are simplified for ease of understanding the technical concept of the present invention. Accordingly, variations which combine these embodiments or which do not go beyond the scope of the technical concept of the present invention are possible by a person skilled in the art, and are also encompassed in the present invention. Therefore, the PCs and multifunction device connected to the network are both referred to similarly as an information processing apparatus in the present invention. Moreover, the service is not limited to storage services and scan services. Moreover, the data transferred via the network by the service is not limited to scanned document data.

First Embodiment

A detailed description will be given of a constitution and operations of the first embodiment according to the present invention.

Conceptual Diagram of Operation of the First Embodiment

FIG. 2 is a flowchart conceptually showing the flow of the present embodiment from a launch of a storage service through a launch of a scan service, a search of the storage service, display of search results, operation of a file, and stopping of a storage service. FIG. 2 shows an example of a search of the storage service performed between the storage service of the PC 102 and the scan service of the multifunction device 101.

Figure 5:
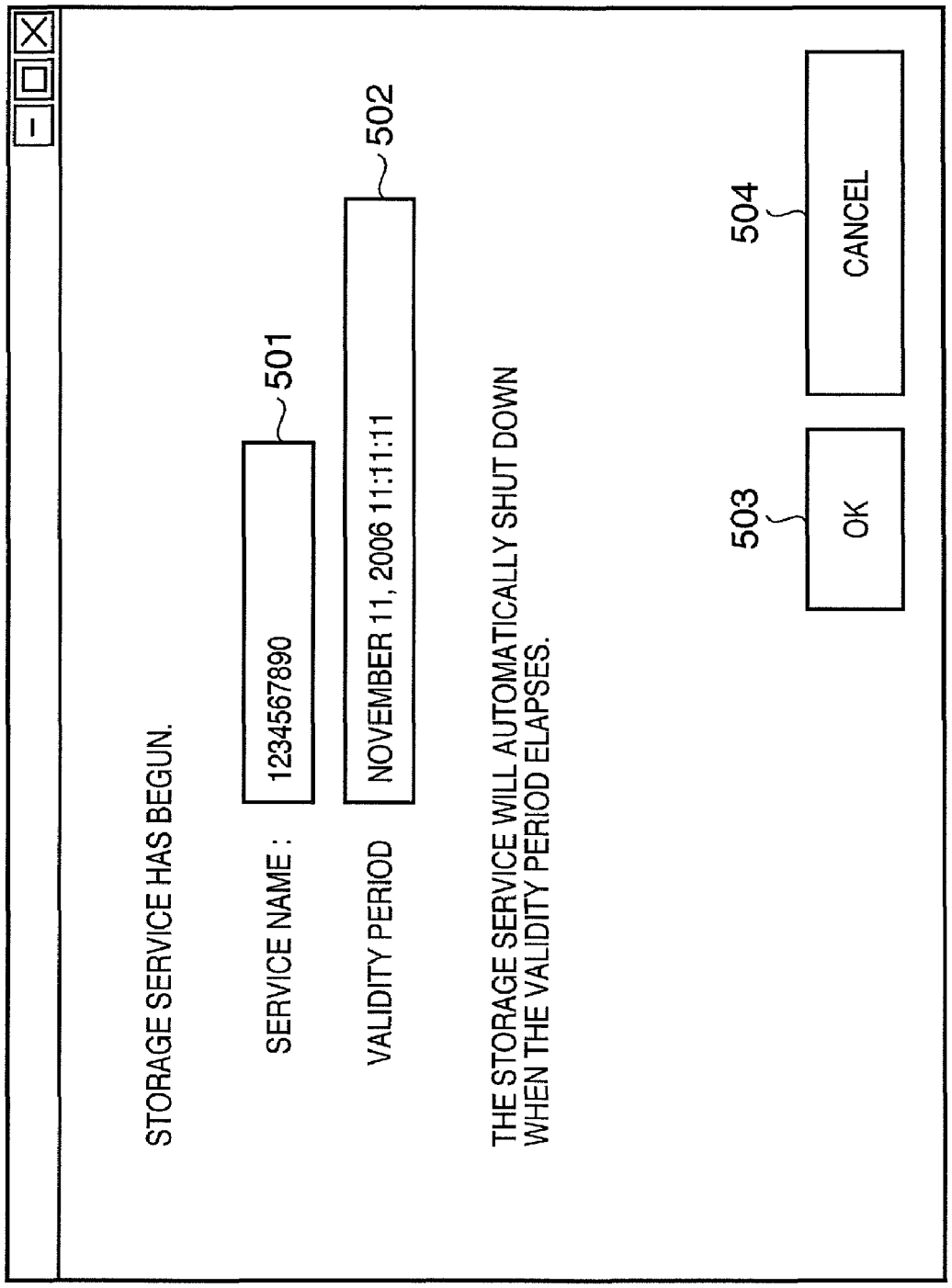
FIG. 5 is a view showing a display window example displayed when a storage service is launched on the PC in the first embodiment.

When the storage service is launched in the PC 102, in step S101 the storage service generates a service name (hereafter also known as a onetime ID) and displays a service name of the kind shown in FIG. 5 to the window of the PC 102. Thereafter, when the user confirms the service name (onetime ID) and presses the OK button, in step S102 the storage service with a relatively short validity period is begun in the PC 102.

Figure 11:
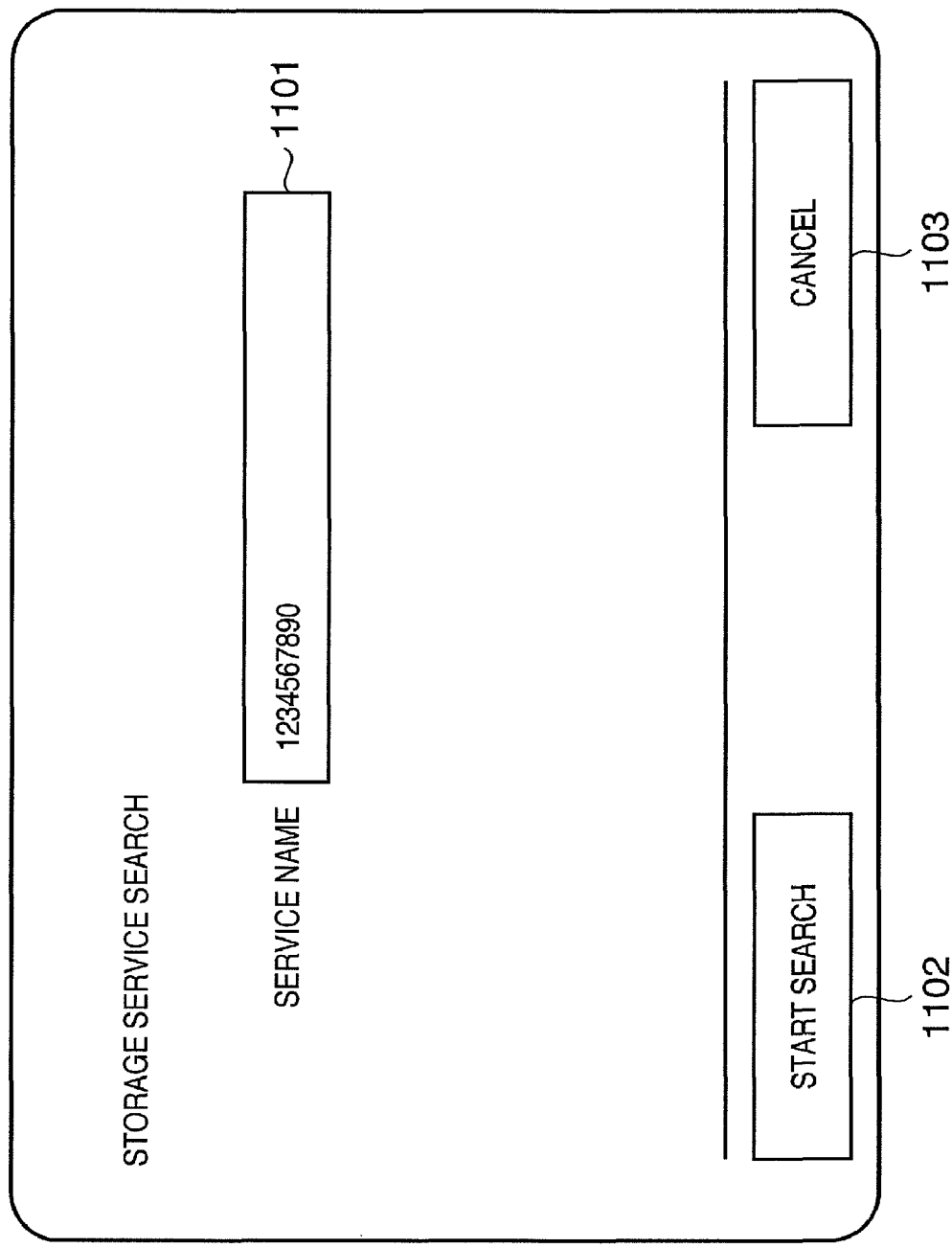
FIG. 11 is a view showing an example of a display window for storage service searching instructions displayed to a touch panel on the multifunction device in the first embodiment.

Meanwhile, the multifunction device 101, which is also a client of the storage service, finds the transfer destination for the scanned data in step S103. For this to happen, the user inputs the service name (onetime ID) from the window as shown in FIG. 11 and the multifunction device 101 begins a search for the storage service. A multicast search packet designated by search conditions is used in the search. The multifunction device 101 transmits the multicast search packet with the input service name designated as a search condition over the LAN 100.

In step S104, the storage service of the PC 102 investigates whether or not the generated service name and the service name (search condition) in the received multicast search packet match when the multicast search packet is received. If they match (they will match if the service name is input correctly), the storage service returns a search reply packet to the multifunction device 101.

Having received the search reply packet, in step S105 the multifunction device 101 displays, as shown in FIG. 12, the service name of the storage service which has replied and the IP address of the PC 102 which is executing the storage service. The user of the multifunction device 101 selects the storage service for the displayed service name. Thereafter, in step S106, the multifunction device 101 can perform file operations such as writing files to or deleting files from the storage service on the PC 102. In step S107, the storage service is stopped and the service name thereof becomes invalid due to the validity period of the storage service launched on the PC 102 elapsing or due to a shutdown instruction by the user on the PC 102.

Example of Constitution of a PC of the Present Embodiment

PC Block Configuration Example

FIG. 3A is a block diagram showing a constitution example of a PC connected to a network in the present embodiment.

302 is an arithmetic and control CPU for governing control of the PC. 303 is a boot ROM in which is stored a boot program executed by the CPU 302. 304 is a RAM used by the CPU 302 as a temporary storage memory. 305 is a non-volatile RAM (NVRAM) for holding values set by the operating unit, for example. 307 is a hard disk drive for storing programs and data executed by the CPU 302. 308 is a timer for counting the current time and time intervals. 309 is an I/O controller unit for controlling a user interface unit 314 including speakers, a display unit, an operating unit, lamps, etc. 310 is a network controller unit for controlling transmission via the network to which the PC is connected. 315 is a power source controller unit for controlling the supply of power. These component elements are all connected to a bus 311.

The programs controlling the PC are stored in the hard disk drive 307. When power is supplied via the power source controller unit 315, the CPU 302 reads the boot program from the boot ROM 303 and executes the booting up of the PC in accordance with the control of the boot program. The CPU 302 places the PC control boot program from the hard disk drive 307 to the RAM 304 and executes control of the PC by reading the PC controlling programs placed in the RAM 304.

Moreover, in FIG. 3A, the component element storing the programs and data was described as being the hard disk drive 307, but this component elements may be any non-volatile storage medium such as a floppy disk, a CD-ROM, a memory card, and so on.

PC Memory Configuration Example

Figure 3B:
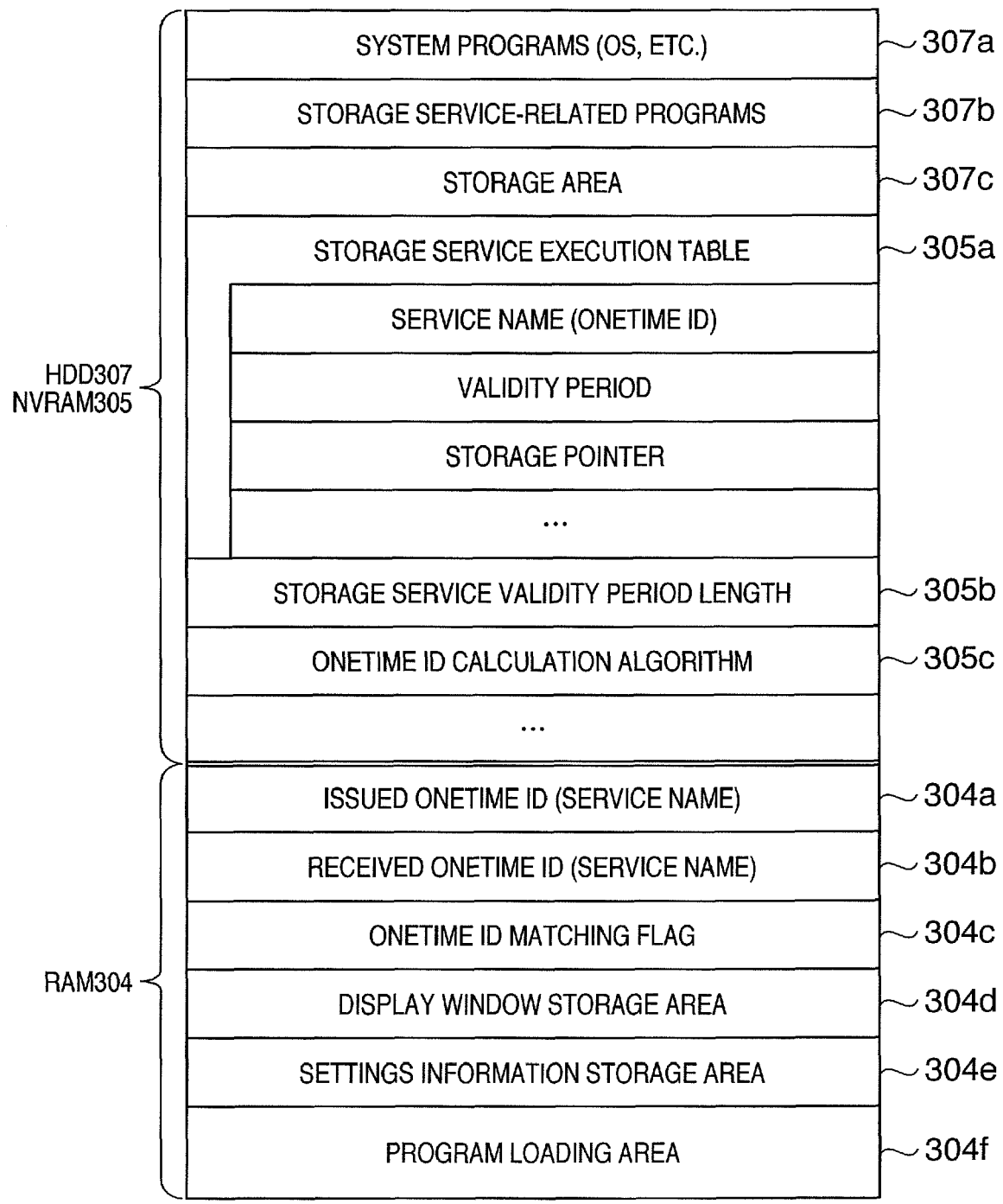
FIG. 3B is a block diagram showing a configuration example of memory in the PC in the present embodiment.

FIG. 3B is a view showing a memory configuration example for the PC connected to a network in the present embodiment. In FIG. 3B, the programs and data related to the first and second embodiments are shown, while other programs and data are omitted. Furthermore, the distribution to the hard disk drive 307, the NVRAM 305, and the RAM 304 of FIG. 3B is only one example and not a limitation.

Figure 4:
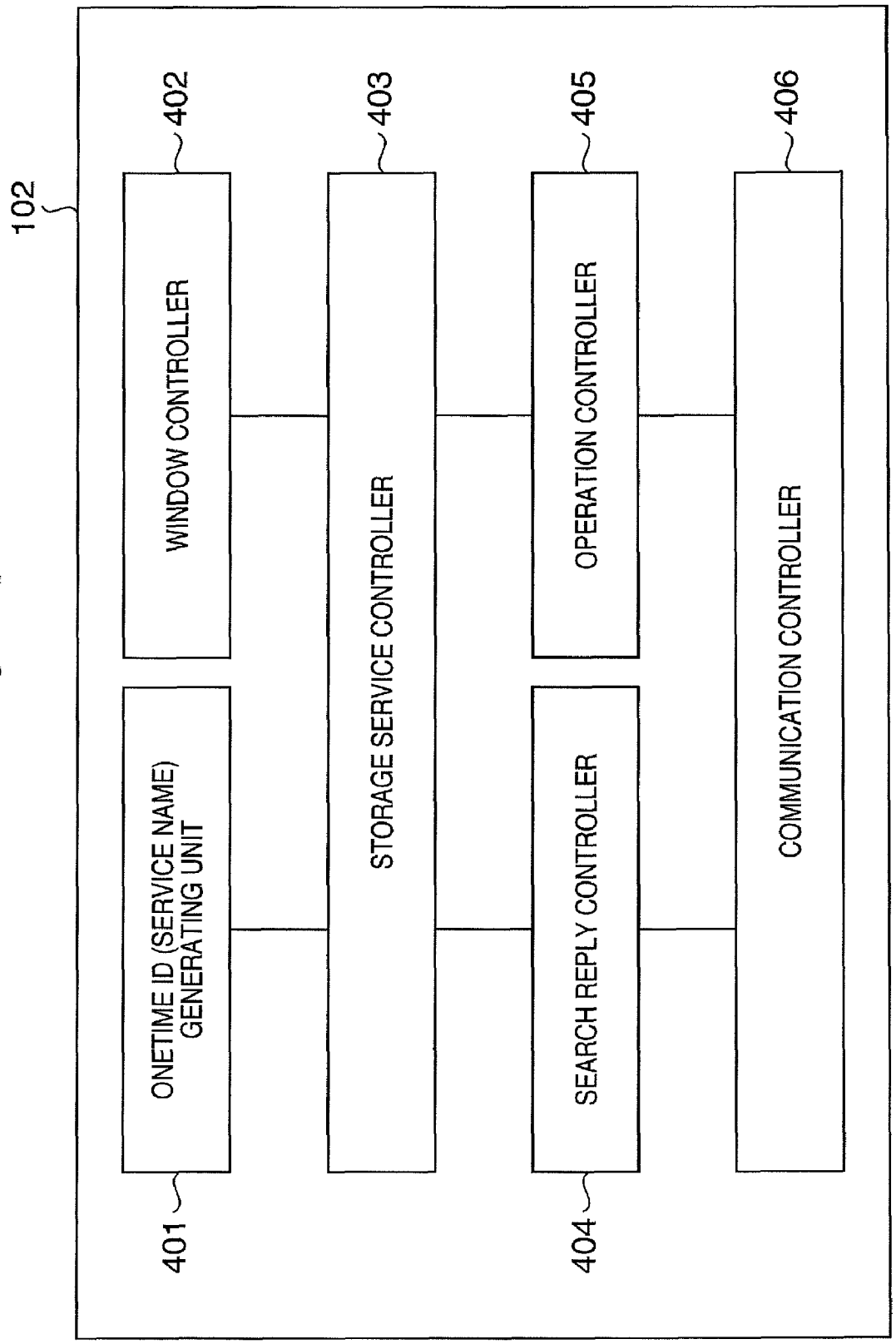
FIG. 4 is a block diagram showing a configuration example of software for a network storage service operating on the PC in the first embodiment.
Figure 20:
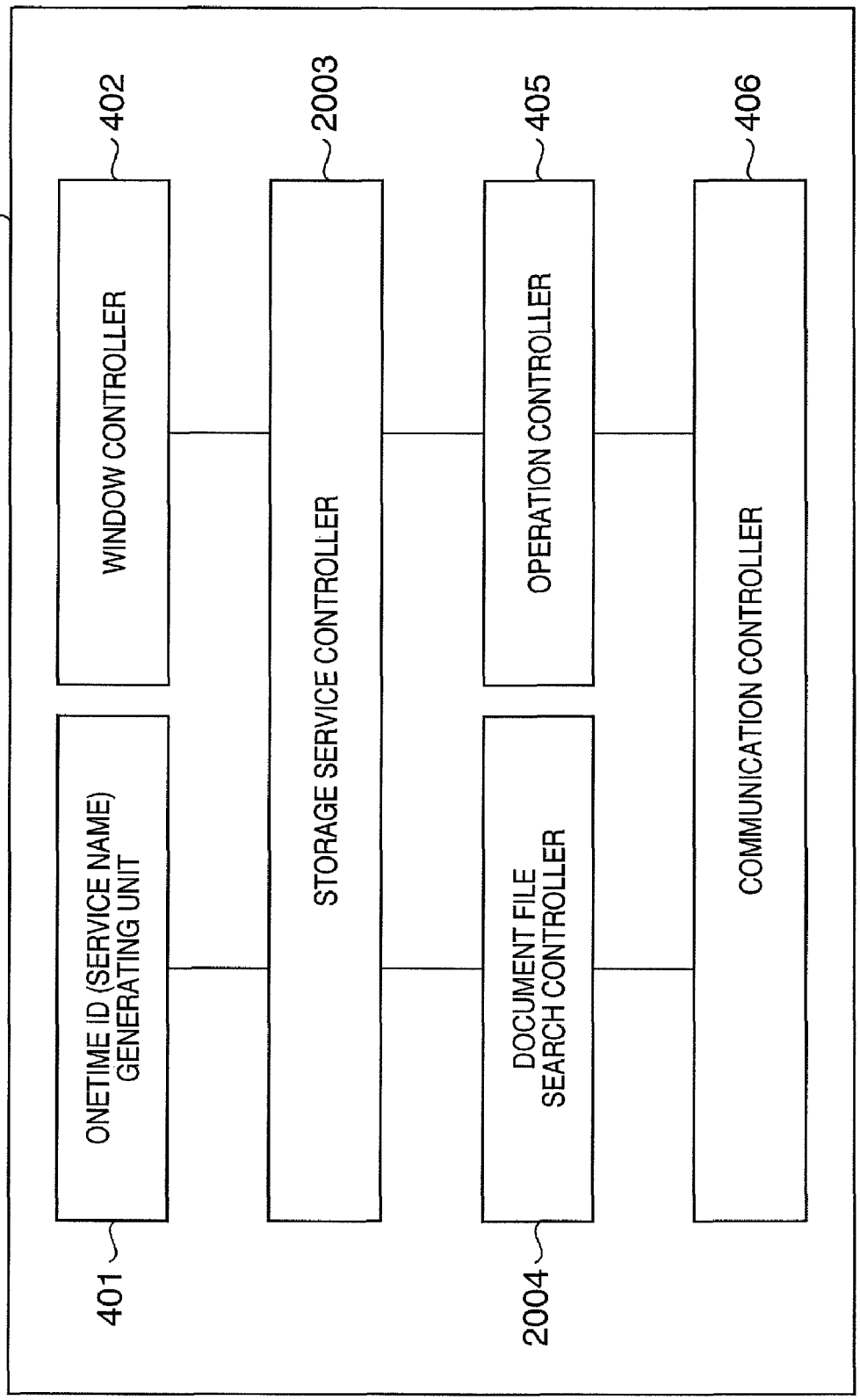
FIG. 20 is a block diagram showing a configuration example of software for a network storage service operating on the PC in the second embodiment.

In FIG. 3B, 307a is a system program including the OS, etc. 307b is programs related to the storage service executed by the PC in the present embodiment, and the content thereof is shown in FIG. 4 and FIG. 20. 307c is a storage area for storing data with the storage service.

305a is a storage service execution table in which is stored the storage service executed by the PC in the present embodiment. The PC can execute a plurality of storage services, and when launching them, allocates a service name (onetime ID) to the storage services and manages the validity periods thereof. A storage pointer searchably points to the storage area of data corresponding to each storage service in the above-mentioned storage area 307c. 305b is an area for storing the validity period length from launch to shutdown of the storage service (the storage service validity period length). 305c is an area for storing what algorithm to use when generating the service name (the onetime ID calculation algorithm). The storage service validity period length 305b and the onetime ID calculation algorithm 305c may be fixed or rewritable by the user. In particular, it is preferable that the onetime ID calculation algorithm 305c be rewritable by the user. Data based on the onetime ID calculation is allocated as the service name (data easily remembered by the user), and this is compared with the data calculated using the onetime ID calculation algorithm 305c by the PC. This makes it possible to ensure simpler data transfer with greater secrecy.

304a is an issued onetime ID (service name) generated and issued by the PC, and, in the second embodiment, a onetime ID (service name) set by the user when launching a storage service. 304b is a received onetime ID (service name) transmitted by another apparatus connected to the network, or in the present embodiment, the multifunction device 101 and received by the PC. 304c is a flag (onetime ID matching flag) indicating whether or not the received onetime ID transmitted from the multifunction device 101 and received by the PC matches the issued onetime ID generated and issued by the PC. 304d is an area (display window storage area) for storing the window displayed to the display unit of the PC (for example, FIG. 5 and FIGS. 21-23). 304e is a settings information storage area for storing other settings information set by the operating unit. 304f is, in the present embodiment, a program loading area for loading programs read from the hard disk drive 307 for execution by the CPU 302.

Operation Example of the PC of the First Embodiment

PC Software Configuration Example

FIG. 4 is a block diagram showing a configuration example of software related to network storage services operating on the PC in the first embodiment. In FIG. 4, the PC 102 is described as an example.

403 is a storage service controller, and is a software module for controlling all operations of storage services operating on the PC 102. 401 is a onetime ID generating unit, and a software module for generating a onetime ID as a temporary identifier when launching a storage service. The storage services of the present embodiment use the onetime ID generated by the onetime ID generating unit 401 as a service name. 402 is a window controller, and a software module for displaying various types of windows for controlling the storage services on the display of the display unit provided to the PC 102.

404 is a search reply controller, and a software module for controlling an operation for returning a reply when search conditions match search requirements from a client on the network. For example, a client designates a service name as a search conditions and issues a search request. In this case, the search reply controller 404 compares the service name designated by the client and the service name of the storage service, and returns a reply to the client if there is a match. On the other hand, if there is no match between the service name the client has designated and the service name of the storage service, the search reply controller 404 does not return a reply. Or the search reply controller 404 returns status information such as the validity period has already elapsed, for example, together with information that there is no match.

405 is an operation controller. The operation controller 405 is a software module for analyzing various instructions from the client to a storage service, notifying the storage service controller 403 of this, and returning a reply on instructions from the storage service controller 403. The operation controller 405 is, for example, a module for analyzing file writing operations and file deleting operations from the client. 406 is a communication controller, and a software module for controlling the TCP/IP protocol, and governs control of TCP/IP communications between the client and the storage service.

PC Display Window Example

FIG. 5 is a view showing an example of a window displayed when a storage service is launched on the PC in the first embodiment.

501 is a service name and displays the onetime ID generated temporarily by the storage service when the storage service of the present embodiment is launched. As described above, a onetime ID is used as a service name for storage services in the present embodiment. The client can thereby search for the desired storage service with the service name as a search condition. 502 indicates the validity period of a storage service, and expresses a time at which the storage service automatically stops after launching. 503 is an OK button, and a storage service is launched when a user presses this button. 504 is a cancel button, and a storage service is shut down without being launched when a user pressed the button.

The storage services of the present embodiment use a onetime ID generated temporarily as the service name, but may be allocated to other search conditions items.

Moreover, in the first embodiment, the service name 501 cannot be rewritten in the window, but the validity period 502 can be rewritten.

Storage Service Control Example

Figure 6:
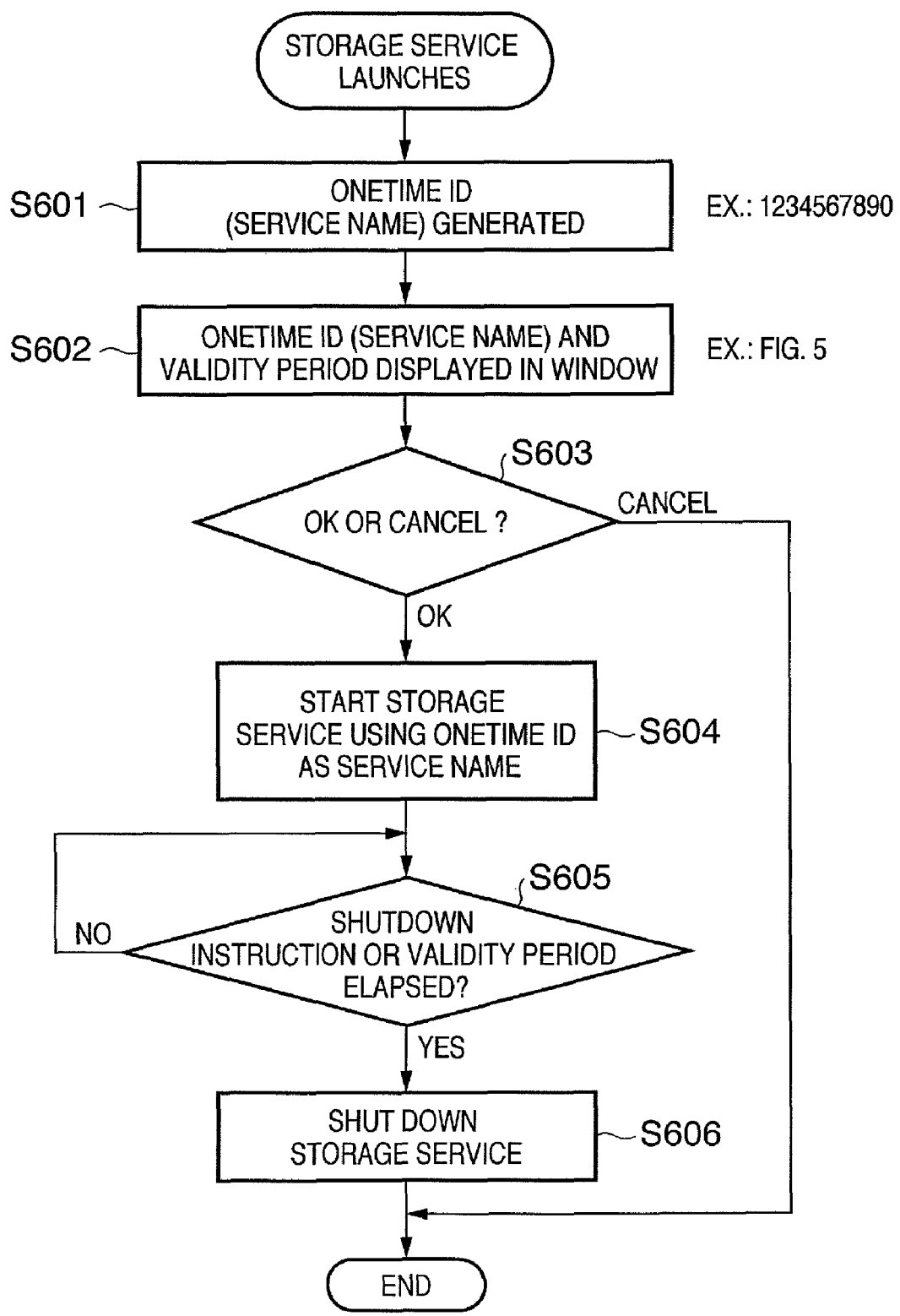
FIG. 6 is a flowchart showing an operation example from the launch to the shutdown of the storage service operating on the PC in the first embodiment.

FIG. 6 is a flowchart showing an operation procedure example from the launch to the shutdown of the storage service operating on the PC in the first embodiment. Note that this flowchart shows the procedure of a program for controlling the launch/shutdown of a storage service. The storage service itself is a sub-routine executed by referencing a launch instruction in step S604 described later (registration to the storage service execution table 305*a*) and a shutdown instruction in step S606 (deletion from the storage service execution table 305*a*).

Once the storage service is launched, the CPU 302 generates a onetime ID using the onetime ID calculation algorithm 305*c* in step S601. The CPU 302 generates a keyword such as, for example, "1234567890." The method for generating a onetime ID is not described in particular here, but it is important that it not overlap with other storage services, by using a combination of a user name of the PC 102, time information, a random value, and the like. In order to avoid overlapping, the onetime ID may be a combination of a keyword input by the user of the PC 102 and a keyword generated by the storage service. Next, in step S602, the CPU 302 displays the window shown in FIG. 5 (onetime ID and validity period) to the display of the PC 102. The onetime ID generated in step S601 is displayed as the service name 501. The user of the PC 102 remembers the service name (onetime ID) 501 displayed at this time.

Next, in step S603, the CPU 302 judges whether the cancel button 504 has been pressed or the OK button 503 has been pressed. If the cancel button 504 shown in FIG. 5 has been pressed, the CPU 302 shuts down the storage service. On the other hand, if the OK button 503 has been pressed, the procedure moves to step S604. In step S604, the CPU 302 performs a process for starting the storage service. At this time, the onetime ID generated in step S601 is used as the service name for the storage service. Thereafter, in step S605, the CPU 302 judges whether or not the user has instructed to shut down, and further, judges whether or not the validity period has elapsed. If the user has instructed to shut down or the validity period has elapsed, the CPU 302 performs a process to shut down the storage service in step S606.

Moreover, in the present embodiment, the service name remembered by the user and input in the window shown in FIG. 11 has been described as a onetime ID, but it is difficult for the user to remember a ten-digit number like "1234567890." Accordingly, data which the user can more easily remember may be used as the service name remembered by the user and input in the window shown in FIG. 11, such as data generated part-way through the calculation of the onetime ID or data which serves as the basis for the calculation of the onetime ID. In this case, data generated part-way through the calculation of the onetime ID or data which serves as the basis for the calculation of the onetime ID is displayed as the service name in the window shown in FIG. 5. Further, as shown in step S702 shown in FIG. 7, it is also possible for the PC to ultimately calculate the onetime ID based on a service name obtained from the multifunction device 101, and judge whether this matches with the generated onetime ID. Further, no particular description is given of the validity period, but it may be made so as to be in advance by the user, or no validity period in particular may be set at all.

Storage Service Inquiry Reply Procedure Example

Figure 7:
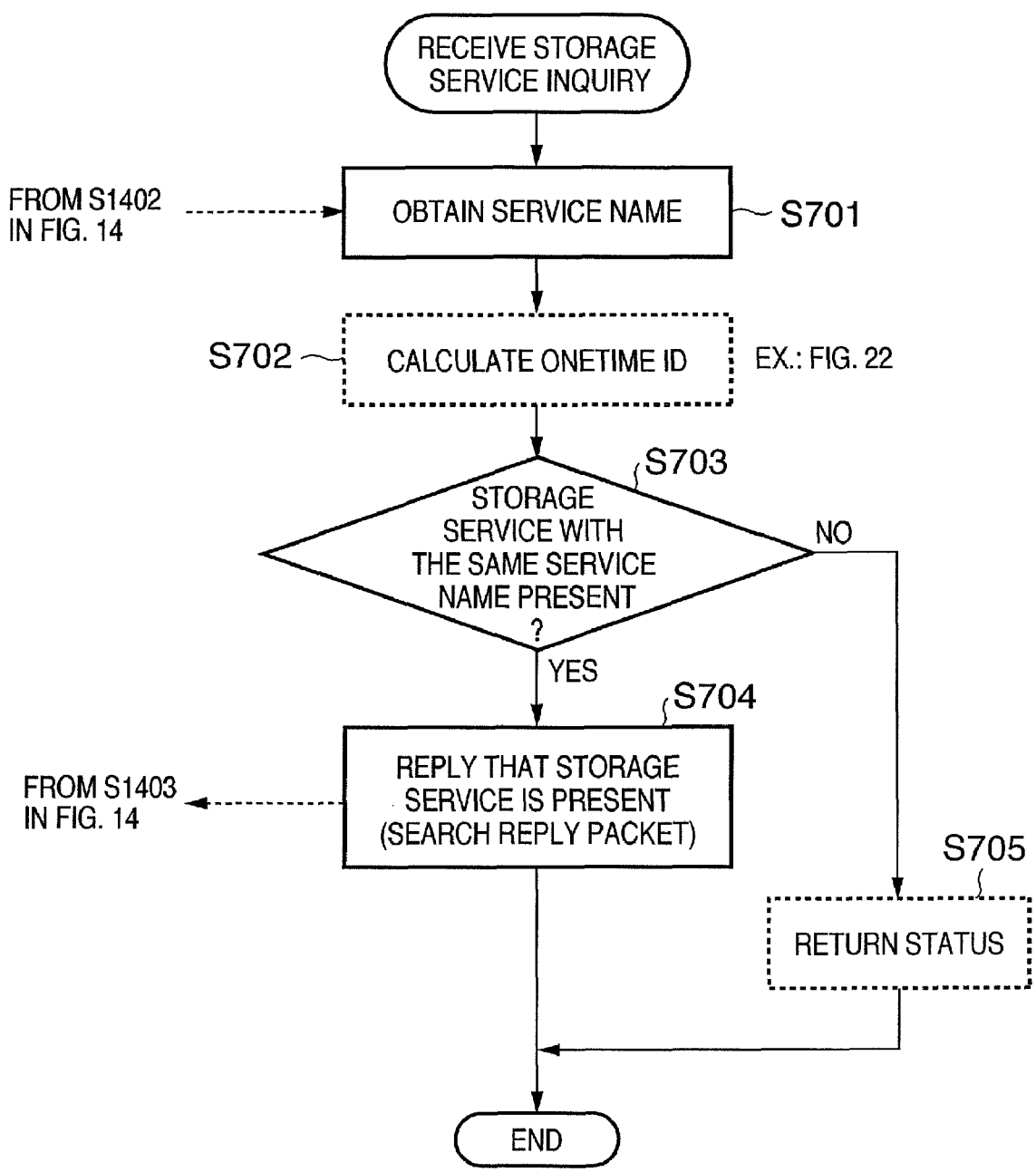
FIG. 7 is a flowchart showing an operation example of an inquiry to the storage service operating on the PC in the first embodiment.

FIG. 7 is a flowchart showing a procedure example for replying after judging whether or not a storage service corresponding to the service name transmitted from the multifunction device 101 is being executed by the PC.

First, in step S701, the CPU 302 obtains a service name from a received multicast search packet. If the service name to be entered in the window shown in FIG. 11 has been designed as the onetime ID itself, then the procedure moves to step S703. In step S703, the CPU 302 compares the service name obtained in step S701 and the onetime ID generated in step S601, searches for a storage service having the same service name as the service name obtained in step S701. If a storage service with the same service name is found, the CPU 302 returns a search reply packet including information indicating that a storage service exists and that service name (onetime ID) in step S704. Moreover, an address (e.g., an IP address) in the network of the PC which is executing the storage service is included in the search reply packet. On the other hand, if no storage service is found with the same service name, the process ends without a reply, or in step S705 the CPU 302 returns status information indicating that the validity period has expired, etc.

If the service name input in the window shown in FIG. 11 is designed as the data generated during calculation of the onetime ID or as the data serving as the basis for calculation, then step S702 is executed. In step S702, the CPU 302 calculates a onetime ID based on the obtained service name and the onetime ID calculation algorithm 305*c*. In step S703, the CPU 302 searches for a storage service in which the onetime ID calculated in step S702 is the service name.

Example of Constitution of a Multifunction Device of the Present Embodiment

Multifunction Device Block Configuration Example

Figure 8A:
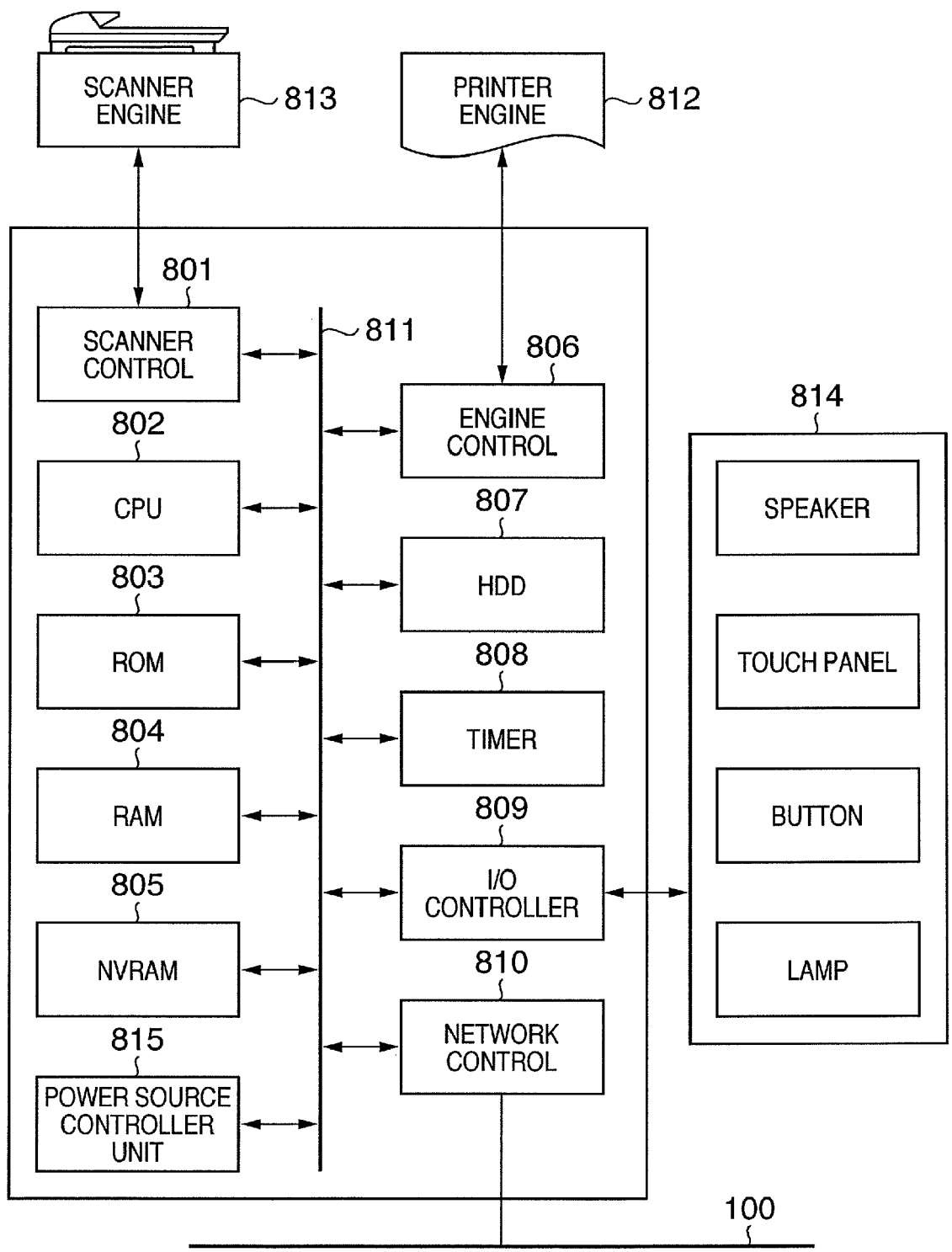
FIG. 8A is a block diagram showing a general configuration example of a multifunction device in the present embodiment.

FIG. 8A is a block diagram showing a general configuration example of a multifunction device in the present embodiment.

In FIG. 8A, 801 is a scanner controller unit for controlling a scanner engine 813. 802 is an arithmetic and control CPU for governing control of the multifunction device. 803 is a boot ROM in which is stored a boot program executed by the CPU 802. 804 is a RAM used by the CPU 802 as a temporary storage memory. 805 is a non-volatile RAM (NVRAM) for holding values set by the operating unit, for example. 806 is an engine controller unit for controlling a printer engine 812. 807 is a hard disk drive for storing programs and data executed by the CPU 802. 808 is a timer for counting the current time and time intervals. 809 is an I/O controller unit for controlling a user interface unit 814 including speakers, a touch panel, buttons, lamps, etc. 810 is a network controller unit for controlling transmission via the network to which the multifunction device is connected. 815 is a power source controller unit for controlling the supply of power. These component elements are all connected to a bus 811.

The programs controlling the multifunction device are stored in the hard disk drive 807. When power is supplied via the power source controller unit 815, the CPU 802 reads the boot program from the boot ROM 803 and executes the booting up of the multifunction device in accordance with the control of the boot program. The CPU 802 places a multifunction device control program from the hard disk drive 807 into the RAM 804 according to the boot program. The CPU 802 executes control of the multifunction device by reading the multifunction device control program placed in the RAM 804.

Moreover, in FIG. 8A, the component element storing the programs and data was described as being the hard disk drive 807, but this component elements may be any non-volatile storage medium such as a floppy disk, a CD-ROM, a memory card, and so on.

Multifunction Device Memory Configuration Example

Figure 8B:
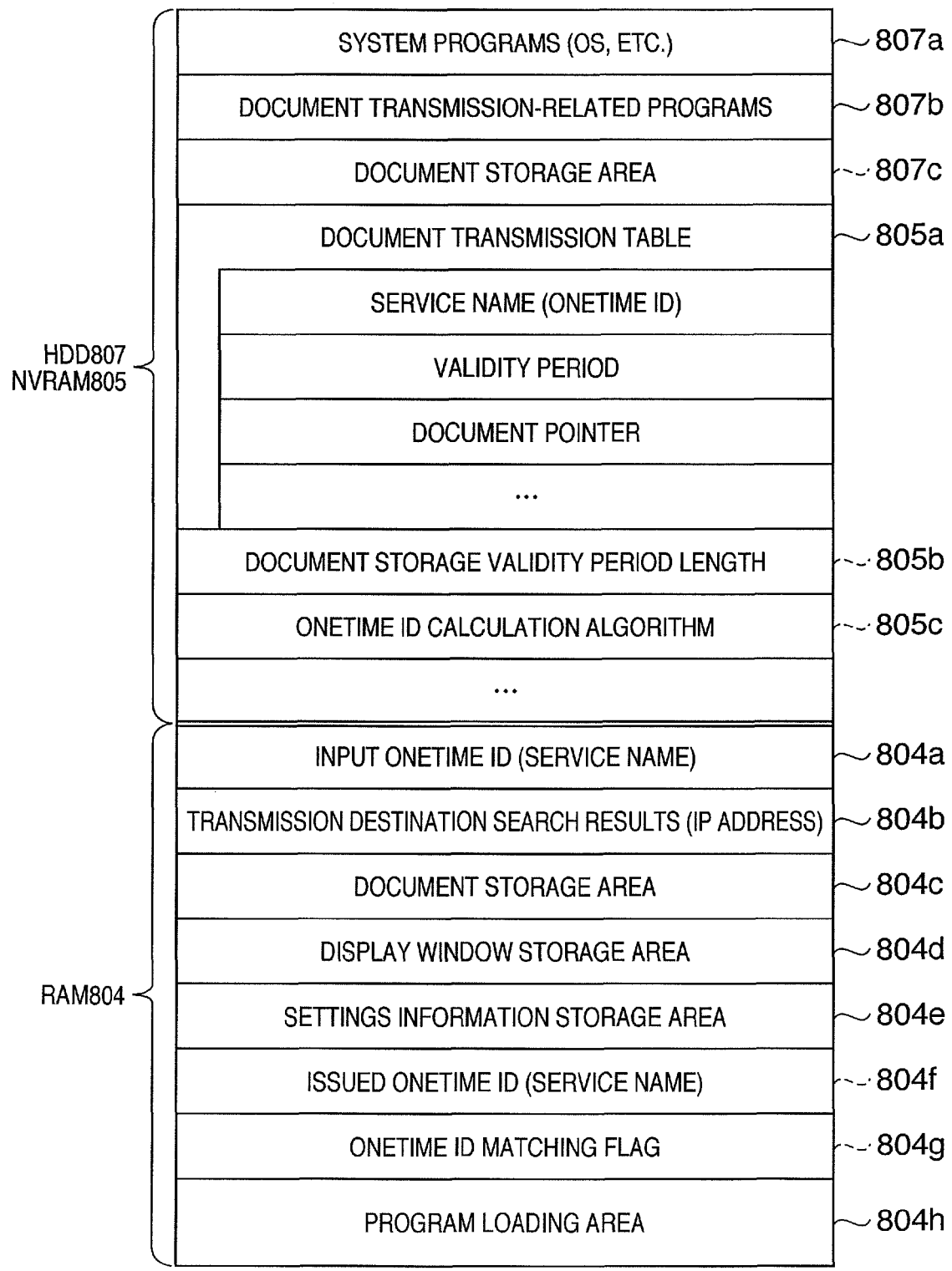
FIG. 8B is a block diagram showing a configuration example of memory in the multifunction device in the present embodiment.

FIG. 8B is a view showing a memory configuration example for the multifunction device connected to a network in the present embodiment. In FIG. 8B, the programs and data related to the first and second embodiments are shown, while other programs and data are omitted. Furthermore, the distribution to the hard disk drive 807, the NVRAM 805, and the RAM 804 of FIG. 8B is only one example and not a limitation.

Figure 10:
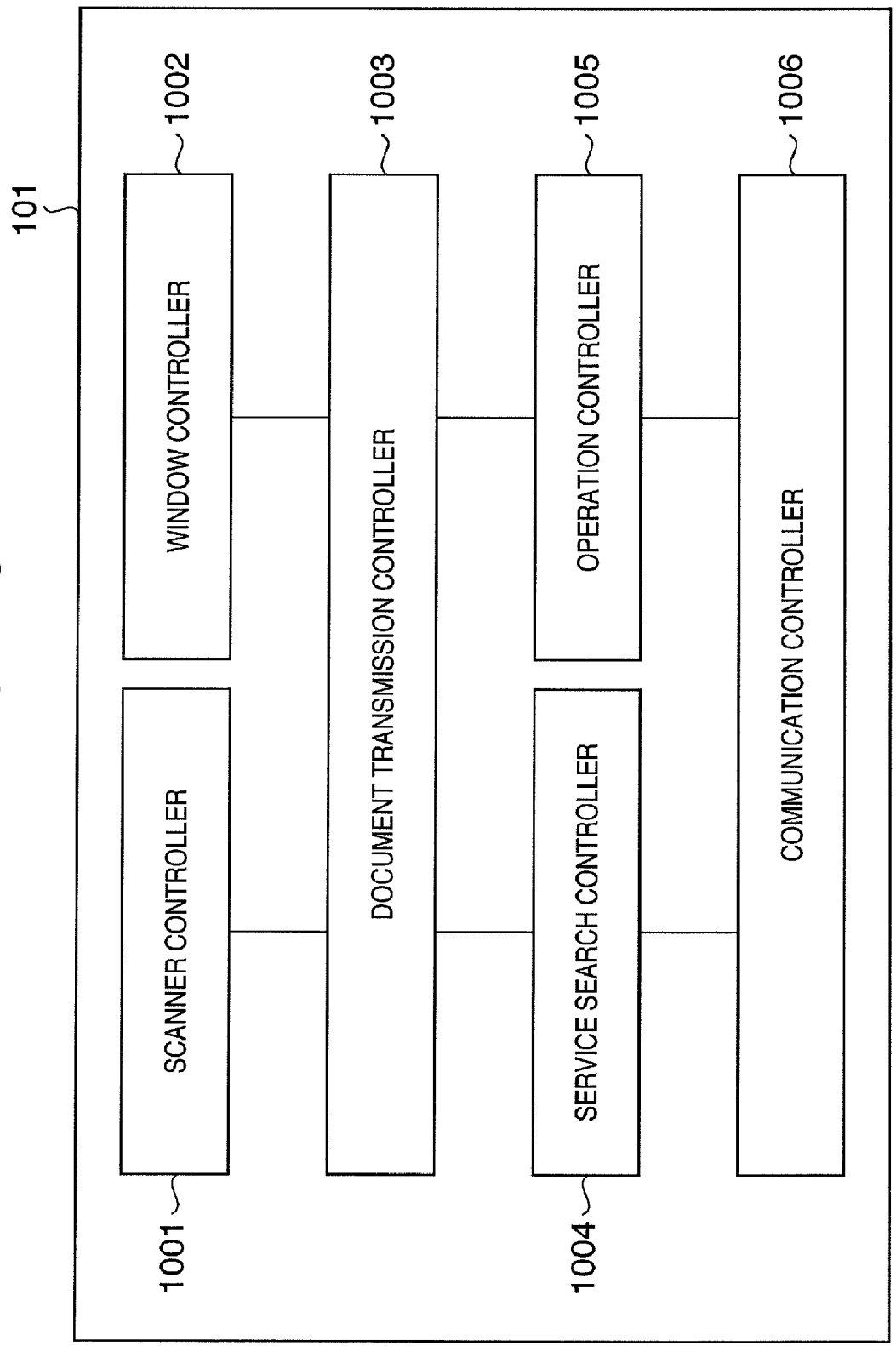
FIG. 10 is a block diagram showing a configuration example of software that controls a document transmission function on the multifunction device in the first embodiment.
Figure 16:
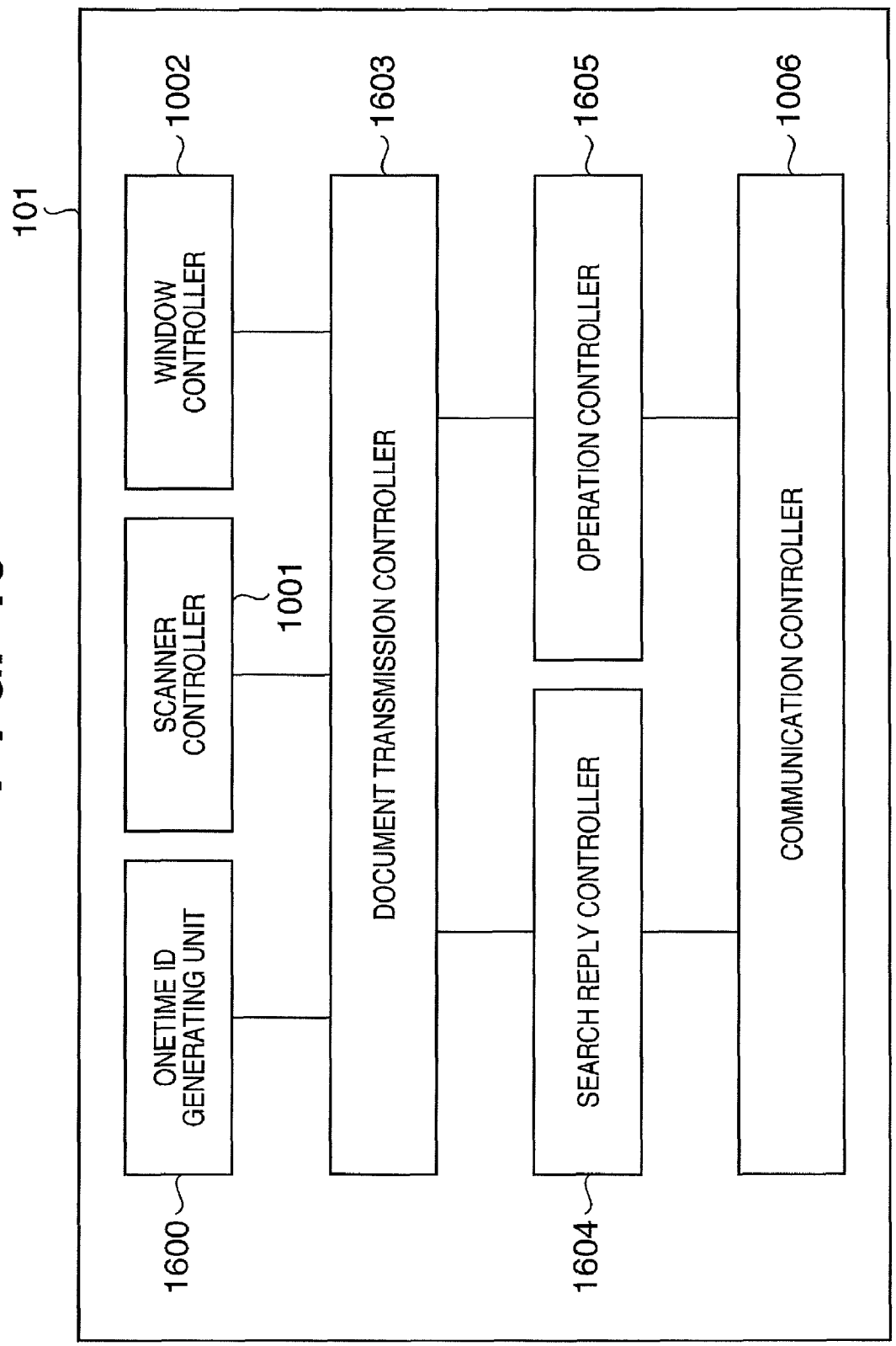
FIG. 16 is a block diagram showing a configuration example of software that controls a document transmission function on the multifunction device in a second embodiment.

In FIG. 8B, 807*a* is a system program including the OS, etc. 807*b* is programs (document transmission-related programs) related to the scan services and the storage services executed by the multifunction device in the present embodiment, and the content thereof is shown in FIG. 10 and FIG. 16. 807*c* is a storage area (document storage area) for storing data with the scan services.

805*a* is a document transmission table in which are stored the scan services executed by the multifunction device in the present embodiment. The multifunction device can execute a plurality of scan services, and when launching them, allocates a service name (onetime ID) to the scan services and manages the valid periods thereof. A document pointer searchably points to the storage area of data corresponding to each scan service in the above-mentioned document storage area 807*c*. 805*b* is an area for storing the validity period length from launch to shutdown of a scan service (the document storage validity period length). 805*c* is an area for storing what algorithm to use when generating the service names (the onetime ID calculation algorithm). The document storage validity period length 805*b* and the onetime ID calculation algorithm 805*c* may be fixed or rewritable by the user. In particular, it is preferable that the onetime ID calculation algorithm 805*c* be rewritable by the user. Data based on the onetime ID calculation is allocated as the service name (data easily remembered by the user), and this is compared with the data calculated using the onetime ID calculation algorithm 805*c* by the multifunction device. This makes it possible to ensure simpler data transfer with greater secrecy.

804*a* is the input onetime ID (service name) input from the touch panel during a storage service search, and in the second embodiment, the onetime ID (service name) generated and issued when launching a scan service. 804*b* is a storage area for the transmission destination data (transmission destination search result) (a PC's network address, such as an EP address, for example) captured from information returned as the storage service search results. 804*c* is a storage area (document storage area) for document data which was scanned or which is to be transmitted. 804*d* is an area (display window storage area) for storing the windows displayed to the touch panel of the multifunction device 101 (for example, FIG. 11 and FIGS. 13-17). 804*e* is a settings information storage area for storing other settings information set by the operating unit.

804*f* is an issued onetime ID (service name) transmitted by another apparatus connected to the network, or in the present embodiment, the PC and received by the multifunction device 101. 804*g* is a flag (onetime ID matching flag) indicating whether or not the onetime ID transmitted from the PC and received by the multifunction device 101 matches the onetime ID generated and issued by the multifunction device 101. The issued onetime ID 804*f* and the onetime ID matching flag 804*g* are data used in the second embodiment. 804*h* is, in the present embodiment, a program loading area for loading programs read out from the hard disk drive 807 for execution by the CPU 802.

FIG. 9 is a view showing an example of a user interface unit provided to the multifunction device 101 in the present embodiment.

901 is a large touch panel, and the user can make various settings by operating the touch panel 901. The window shown in FIG. 9 is a copy standby window. 902 is a numeric keypad used for inputting the numbers from 1 to 0. The S button is a service button. By pressing the S button, a variety of service windows appear on the touch panel and the user can perform services other than copying. In the present embodiment, when the user presses the S button, the document transmission service launches, and it is possible to transmit scanned data to the storage (hard disk drive, etc.) of any PC. The R button is the settings button. By pressing the R button, a variety of settings windows appear on the touch panel, and the user can set parameters. 903 is speakers, and outputs audio, buzzer sounds, etc. 904 is a lamp, and flashes during printing or copying jams. 905 is a power saving on/off button, and is for the user to perform button operations for changing to and restoring from power saving mode.

First Embodiment Multifunction Device Operating Example

Multifunction Device Software Configuration Example

FIG. 10 is a block diagram showing a configuration example of software that controls a document transmission function on the multifunction device 101 in the present embodiment.

1003 is a document transmission controller, and is a software module for controlling all document transmission of the multifunction device 101. 1001 is a scanner controller, and is a software module for controlling the scanner engine 813 and reading from the paper document. 1002 is a window controller, and is a software module for controlling the user interface unit 814 such as the touch panel 901, etc. 1004 is a service search controller, and is a software module for designating search conditions and searching for storage services. 1005 is an operation controller, and is a software module for performing communication with storage services, for example writing files and deleting files. 1006 is a communication controller, and is a software module for controlling TCP/IP communication.

Multifunction Device Display Window Example

FIG. 11 is a view showing an example of a storage service search window displayed to the touch panel 901 on the multifunction device 101 in the first embodiment.

1101 is a field for inputting a service name as a search condition. In FIG. 11, the user inputs "1234567890" displayed in the window shown in FIG. 5. 1102 is a start search button, and when the user presses this button, the multifunction device 101 begins to search for a storage service on the network having the input service name 1101. 1103 is a cancel button, and the user presses this button when the user wishes to interrupt the search for a storage service.

Figure 13:
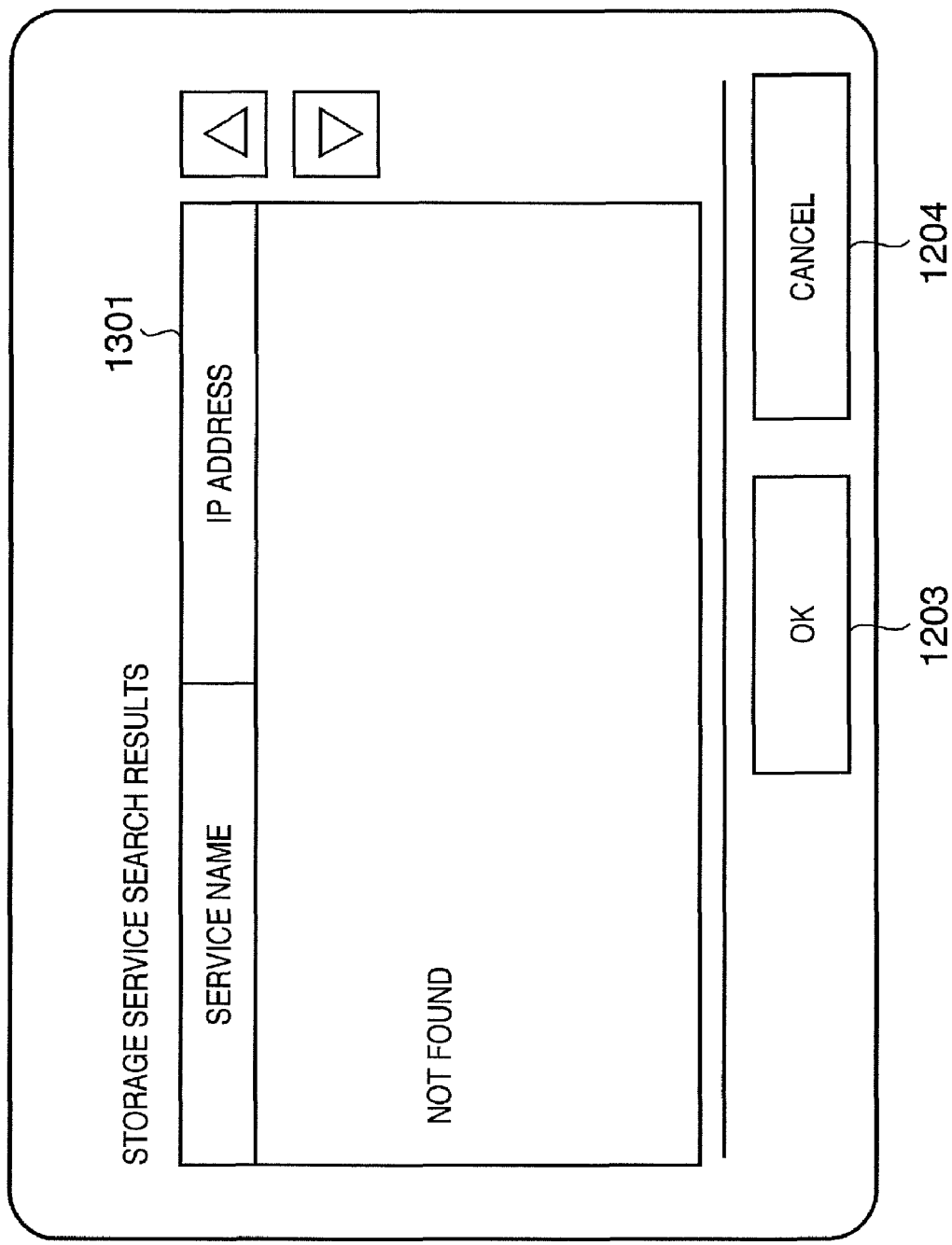
FIG. 13 is a view showing an example of a display window for storage service search results displayed to the touch panel on the multifunction device in the first embodiment.

FIG. 12 and FIG. 13 are views showing examples of a storage service search results window displayed to the touch panel 901 on the multifunction device 101 in the first embodiment. FIG. 12 is an example when the storage service is found, and FIG. 13 is an example when no storage service is found. FIG. 12 shows that one storage service with the service name "1234567890" was found by searching. In this case, the service name and the IP address of the PC are displayed in the storage service search results 1201. By selecting the service displayed in the storage service search results 1201 and pressing the OK button 1203, the user may thereafter perform file operations on this service such as writing and deleting files. If a plurality of storage services is found, the user selects the desired storage service with selection buttons 1202 and then presses the OK button 1203. If there is no transmission of scanned document data to a storage service, or if it is finished, the user presses the cancel button 1204 to shutdown the service. FIG. 13 shows that no storage service was found by searching. In this case, the service name and the IP address of the PC are not displayed in the storage service search results 1301, and "Not found," for example, is displayed.

Storage Service Search Control Example

Figure 14:
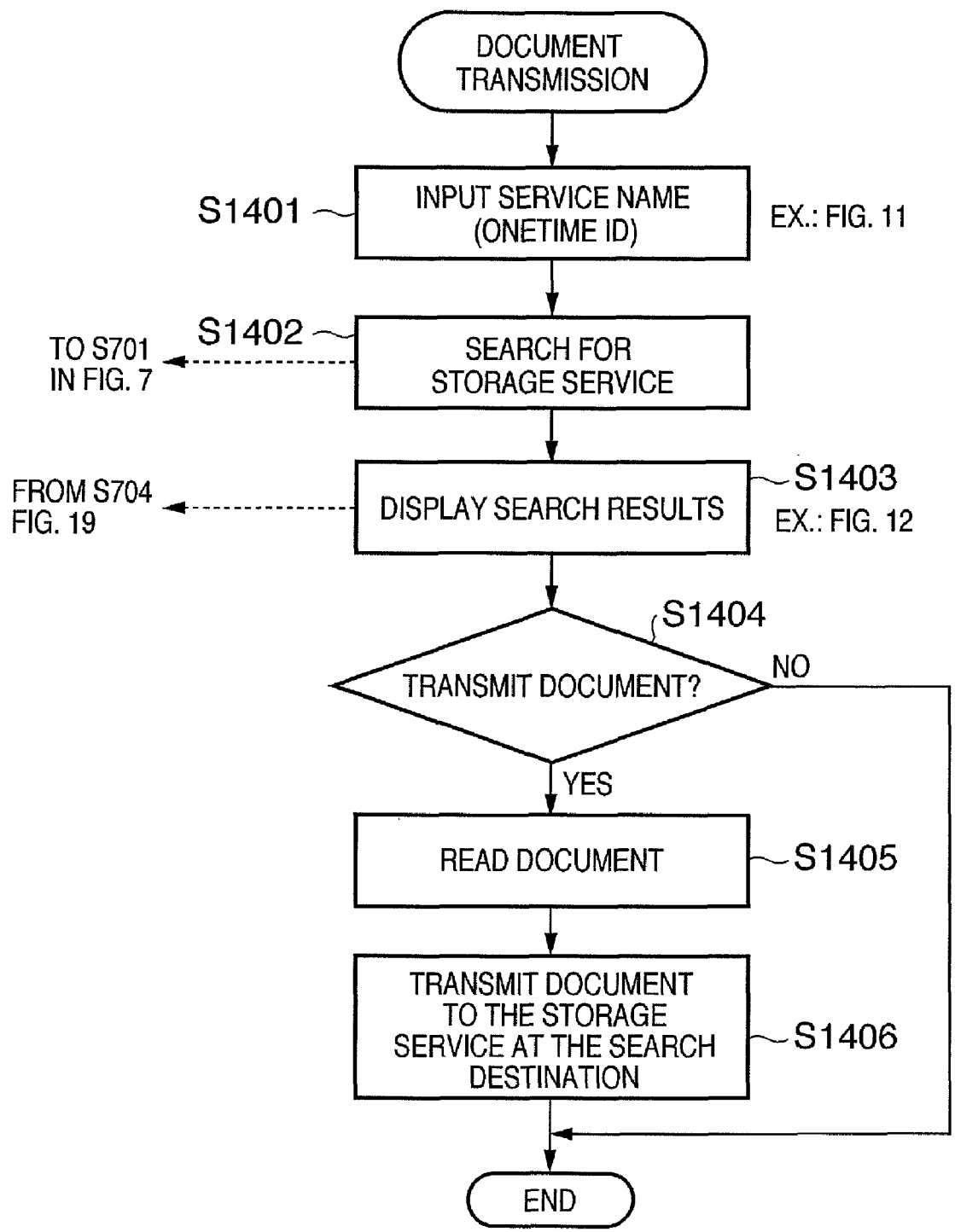
FIG. 14 is a flowchart showing an operation example of a scan service operating on the multifunction device in the first embodiment.

FIG. 14 is a flowchart showing an example of a process procedure of a document scan service of the multifunction device in the first embodiment.

First, when executing the scan service, the CPU 802 displays the window shown in FIG. 11 to the touch panel 901 of the multifunction device and receives input of the service name (onetime ID) by the user (step S1401). In step S1402, the multifunction device transmits a multicast search packet having this service name, and thereby searches for the storage service to which this service name was allocated at launch.

If there is a search reply packet, in step S1403 the multifunction device obtains the service name and the IP address of the PC from the search reply packet, and displays the search results shown in FIG. 12 to the touch panel 901. If there is no search reply packet, the multifunction device displays the search results shown in FIG. 13 to the touch panel 901. In step S1404, the multifunction device judges whether a service has been selected and the OK button 1203 has been pressed or the cancel button 1204 has been pressed. If the cancel button 1204 was pressed, the multifunction device shuts down the scan service. If a service was selected and the OK button 1203 pressed, the multifunction device moves to step S1405 and controls the scanner controller unit 801 such that document data is read by the scanner engine 813. In step S1406, the multifunction device transmits the read document data to the selected storage service based on the IP address of the PC in which the selected storage service is running. Moreover, in order to identify the PC in which the selected storage service is running, in the present embodiment address information such as an IP address is used, but other identification information identifying a PC may be used. Other examples of such identification information are a URL (uniform resource locator) and a host name.

Second Embodiment

A description will be given of the second embodiment according to the present invention. Note that the configuration examples of the PC and the multifunction device are given in the first embodiment, and therefore omitted here.

Conceptual Diagram of Operation of the Second Embodiment

Figure 15:
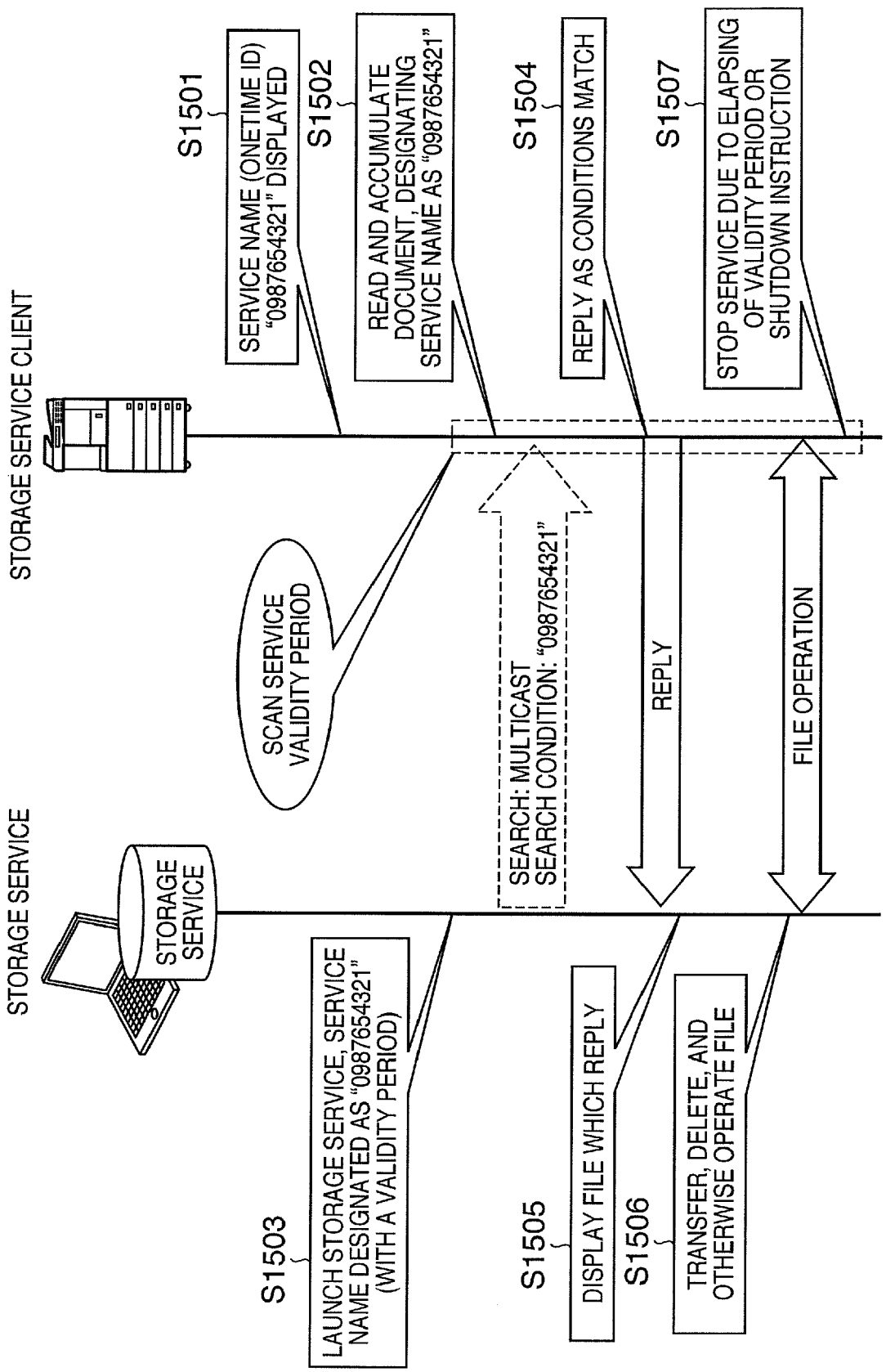
FIG. 15 is an operational flowchart showing the flow from a launch of a scan service through the launch of a storage service, a search through the scan service, a display of search results, operation of a file, and stopping the storage service in a first embodiment.

FIG. 15 is a flowchart conceptually showing the flow of the present embodiment from a launch of a scan service through a launch of a storing service, a search for a scan service, display of search results, operation of a file, and stopping of a storage service. FIG. 15 shows an example of a search of a scan service performed between the scan service of the multifunction device 101 and the storage service of the PC 102.

First, a scan service is launched in the multifunction device 101 which is a client of a storage service. In step S1501, the scan service generates a service name (hereafter also known as a onetime ID), and displays a service name such as that shown in FIG. 17 described later to a window on the multifunction device 101. When the user confirms the service name (onetime ID) and presses the OK button, in step S1502 the scan service (i.e., document reading, accumulating, etc.) begins in the multifunction device 101 with a relatively short validity period. The user remembers the service name (onetime ID).

Meanwhile, in step S1503 a storage service is launched in the PC 102 and the transmission destination for the scanned data is found. The user inputs (designates) the service name (onetime ID) which the user remembered in the window shown in FIG. 21 described later, and the PC 102 begins a search for the scan service. A multicast search packet in which search conditions are designated is used in the search.

The scan service of the multifunction device 101 receives the multicast search packet in step S1504. At this time, the PC 102 checks whether or not the generated service name matches the service name (search condition) in the received multicast search packet. If they match (they will match if the service name is input correctly), the scan service returns a search reply packet to the PC 102.

Figure 22:
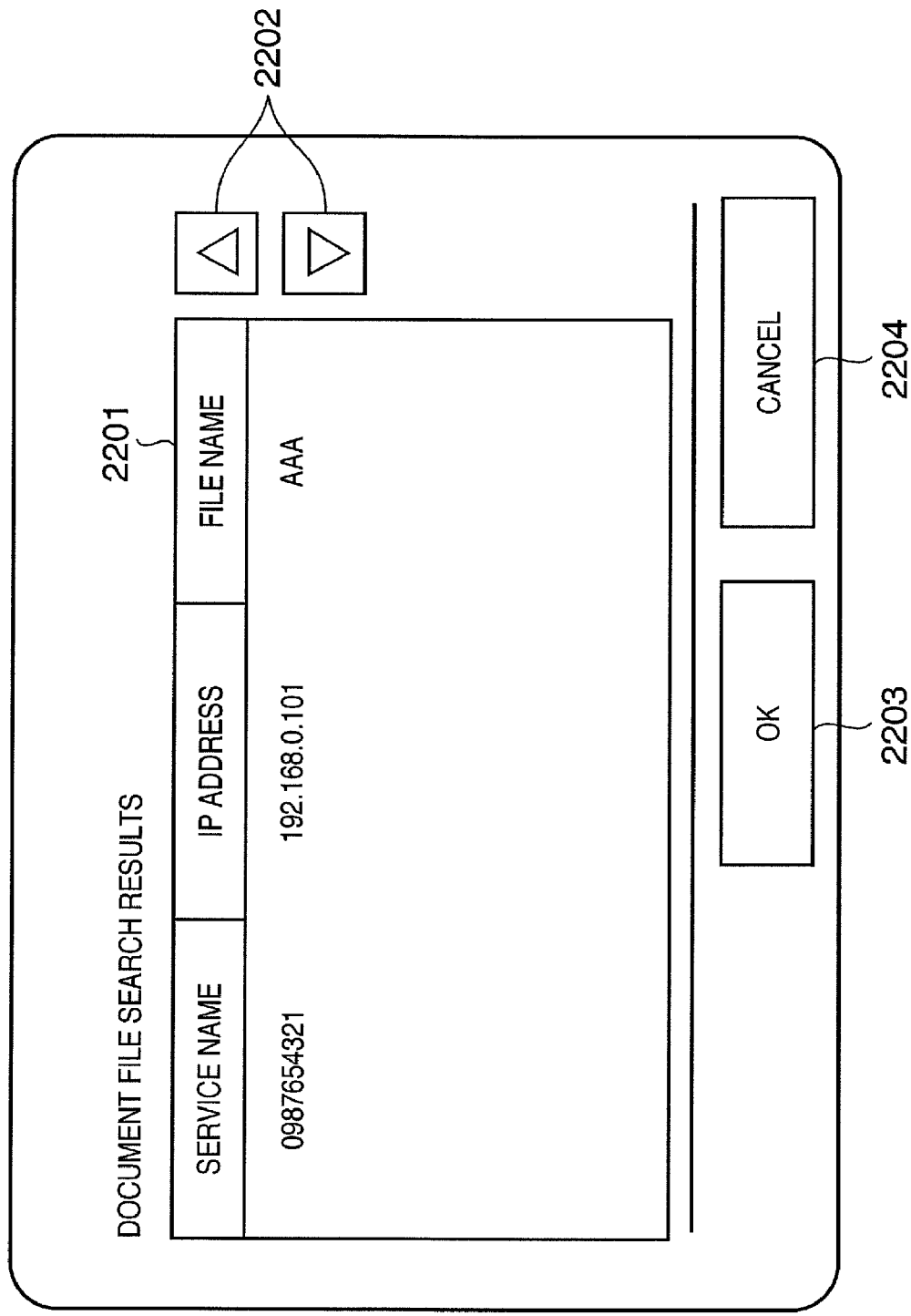
FIG. 22 is a view showing an example of a display window for scan service search results displayed to a display on the PC in the second embodiment.

The PC 102 receives the search reply packet. In step S1505, the PC 102 displays the service name of the scan service which responded, the IP address of the multifunction device 101 which is executing the scan service, and the file name of the document data as shown in FIG. 22 described later. The user of the PC 102 selects the scan service for the displayed service name. Thereafter, in step S1506, the PC 102 can perform file operations such as reading files to or deleting files from the scan service on the multifunction device 101. In step S1507, the scan service is stopped and the service name thereof becomes invalid due to the validity period of the scan service launched on the multifunction device 101 elapsing or due to a shutdown instruction by the user of the PC 102.

Second Embodiment Multifunction Device Operating Example

Multifunction Device Software Configuration Example

FIG. 16 is a block diagram showing a configuration example of software that controls a document transmission function on the multifunction device 101 in the present embodiment. Note that modules performing the same function as in FIG. 10 are given the same reference numerals.

1603 is a document transmission controller, and is a software module for controlling all document transmission of the multifunction device 101. 1600 is a onetime ID generating unit, and a software module for generating a onetime ID as a temporary identifier when launching a scan service. 1001 is a scanner controller, and is a software module for controlling the scanner engine 813 and reading from the paper document. 1002 is a window controller, and is a software module for controlling the user interface unit 814 such as the touch panel 901, etc.

1604 is a search reply controller, and a software module for controlling an operation for returning a reply when search conditions match search requirements from a PC on the network. For example, the storage service on a PC designates a service name as a search condition and issues a search request. In this case, the search reply controller 1604 compares the service name designated by the storage service on the PC and the service name of the scan service, and if they match, performs an operation to return a reply to the PC. At the same time, if there is no match between the service name the storage service of the PC has designated and the service name of the scan service, the search reply controller 1604 does not return a reply. Or the search reply controller 1604 returns status information such as the validity period has already elapsed, for example, together with information that there is no match.

1605 is an operation controller. The operation controller 1605 is a software module for analyzing various instructions from the PC to a scan service, notifying the document transmission controller 1603 of this, and returning a reply on instructions from the document transmission controller 1603. The operation controller 1605 is, for example, a module for analyzing file reading operations and file deleting operations from the storage service of a PC. 1006 is a communication controller, and is a software module for controlling TCP/IP communication.

Multifunction Device Display Window Example

Figure 17:
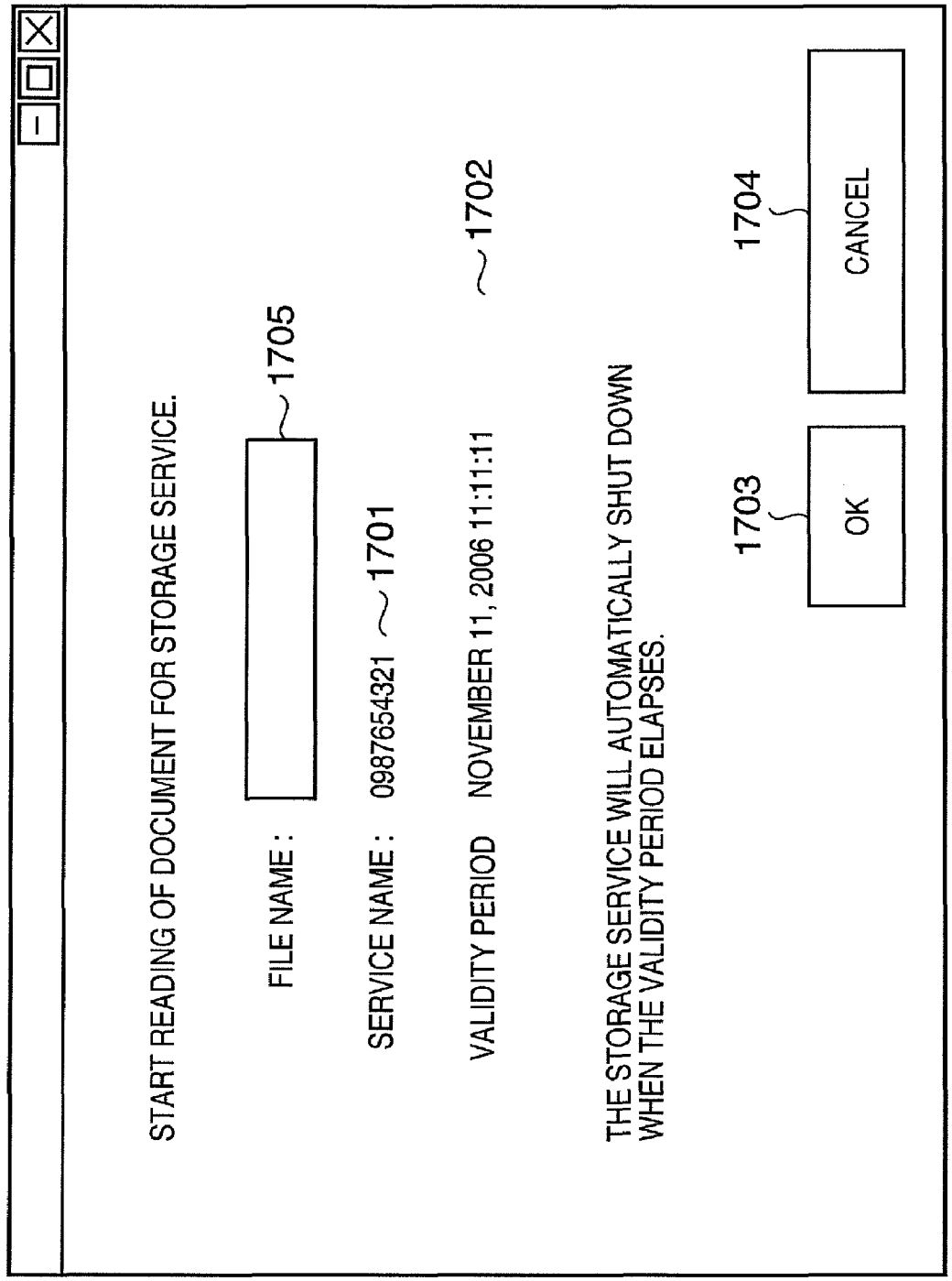
FIG. 17 is a view showing a display window example displayed when a scan service is launched on the multifunction device in the second embodiment.

FIG. 17 is a view showing a window example displayed when a scan service operating on the multifunction device is launched in the second embodiment.

1701 is a service name and displays the onetime ID generated temporarily by the scan service when a storage scan service of the present embodiment is launched. As described above, a onetime ID is used as a service name for scan services in the present embodiment. The storage service of the PC can thereby search for the desired storage service with the service name as a search condition. 1702 indicates the validity period of a scan service, and expresses a time at which the scan service automatically stops after launching. 1703 is an OK button, and a scan service is launched when a user presses this button. 1704 is a cancel button, and a scan service is shut down without being launched when a user pressed the button. 1705 is a file name for storing a document read by the scan service, and can be written by the user.

The scan services of the present embodiment use a onetime ID generated temporarily as the service name, but may be allocated to other search conditions items.

Note that in the second embodiment, the service name 1701 and the validity period 1702 cannot be rewritten in the window.

Scan Service Control Example

Figure 18:
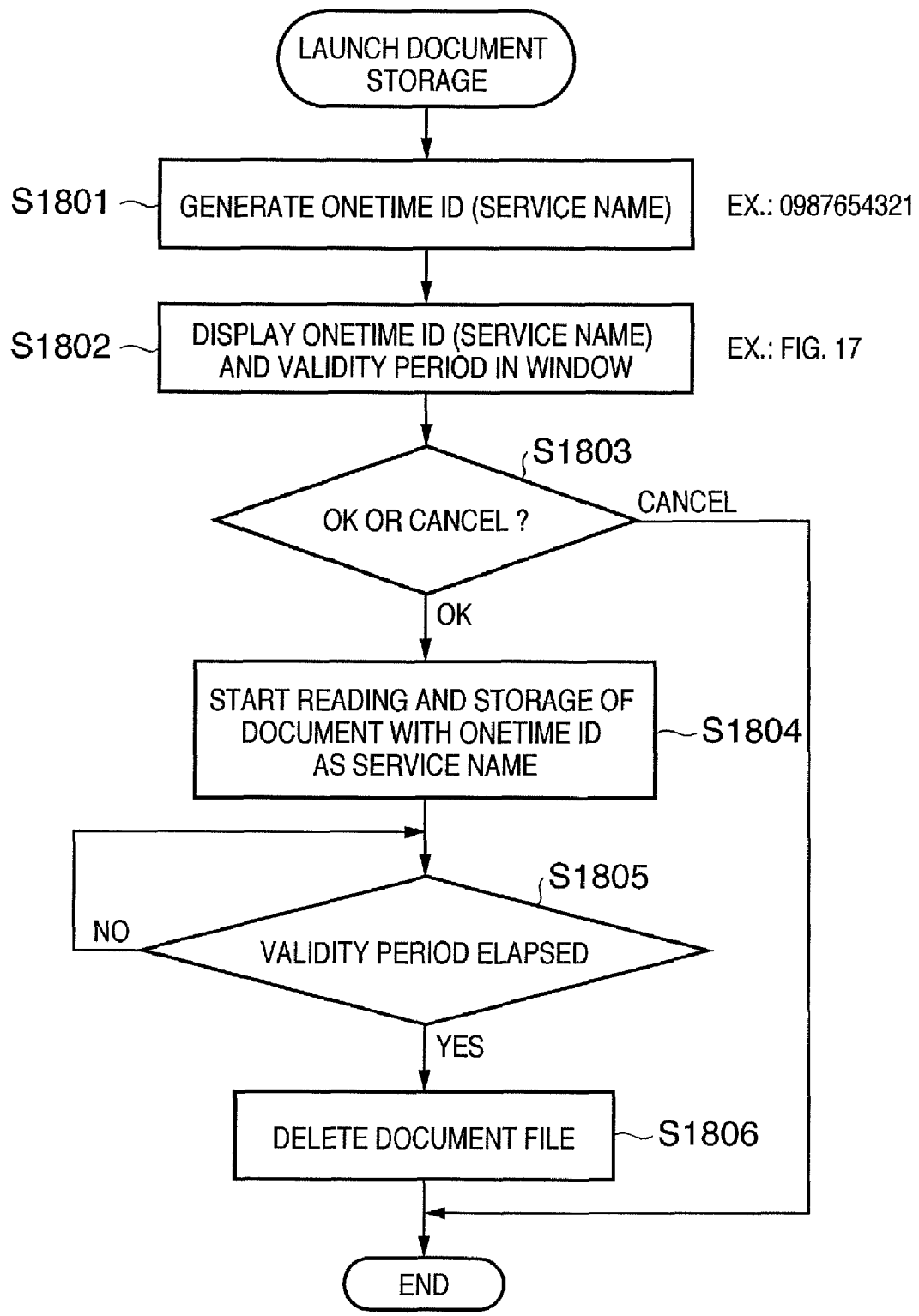
FIG. 18 is a flowchart showing an operation example from the launch to the shutdown of the scan service operating on the multifunction device in the second embodiment.

FIG. 18 is a flowchart showing an operation procedure example from the launch to the shutdown of the scan service operating on the multifunction device in the second embodiment. Note that this flowchart shows the procedure of a program for controlling the launch/shutdown of a scan service. The scan service itself is a sub-routine executed by referencing a launch instruction in step S1804 described later (registration to the document transmission table 805a) and a shutdown instruction in step S1806 (deletion from the document transmission table 805a).

Once the scan service is launched, the CPU 802 generates a onetime ID using the onetime ID calculation algorithm 805c in step S1801. The CPU 802 generates a keyword such as, for example, "0987654321." The method for generating a onetime ID is not described in particular here, but it is important that it not overlap with other scan services, by using a combination of a user name of the multifunction device 101, time information, a random value, and the like. In order to avoid overlapping, the onetime ID may be a combination of a keyword input by the user of the multifunction device 101 and a keyword generated by the scan service. Next, in step S1802, the CPU 802 displays the window shown in FIG. 17 to the touch panel of the multifunction device 101. The onetime ID generated in step S1801 is displayed as the service name 1701. The user of the multifunction device 101 remembers the service name (onetime ID) 1701 displayed at this time.

Next, in step S1803, the CPU 802 judges whether the cancel button 1704 has been pressed or the OK button 1703 has been pressed. If the cancel button 1704 shown in FIG. 17 has been pressed, the CPU 802 shuts down the scan service. On the other hand, if the OK button 1703 has been pressed, the procedure moves to step S1804. In step S1804, the CPU 802 performs a process to begin the scan service (document reading, storing, etc.). At this time, the onetime ID generated in step S1801 is used as the service name for the scan service. The CPU 802 controls the scanner controller unit 801 such that the scanner engine 813 reads the document data. Thereafter, in step S1805, the CPU 802 judges whether or not the validity period has elapsed. If the validity period has elapsed, the CPU 802 deletes the read document data and shuts down the scan service in step S1806.

Figure 21:
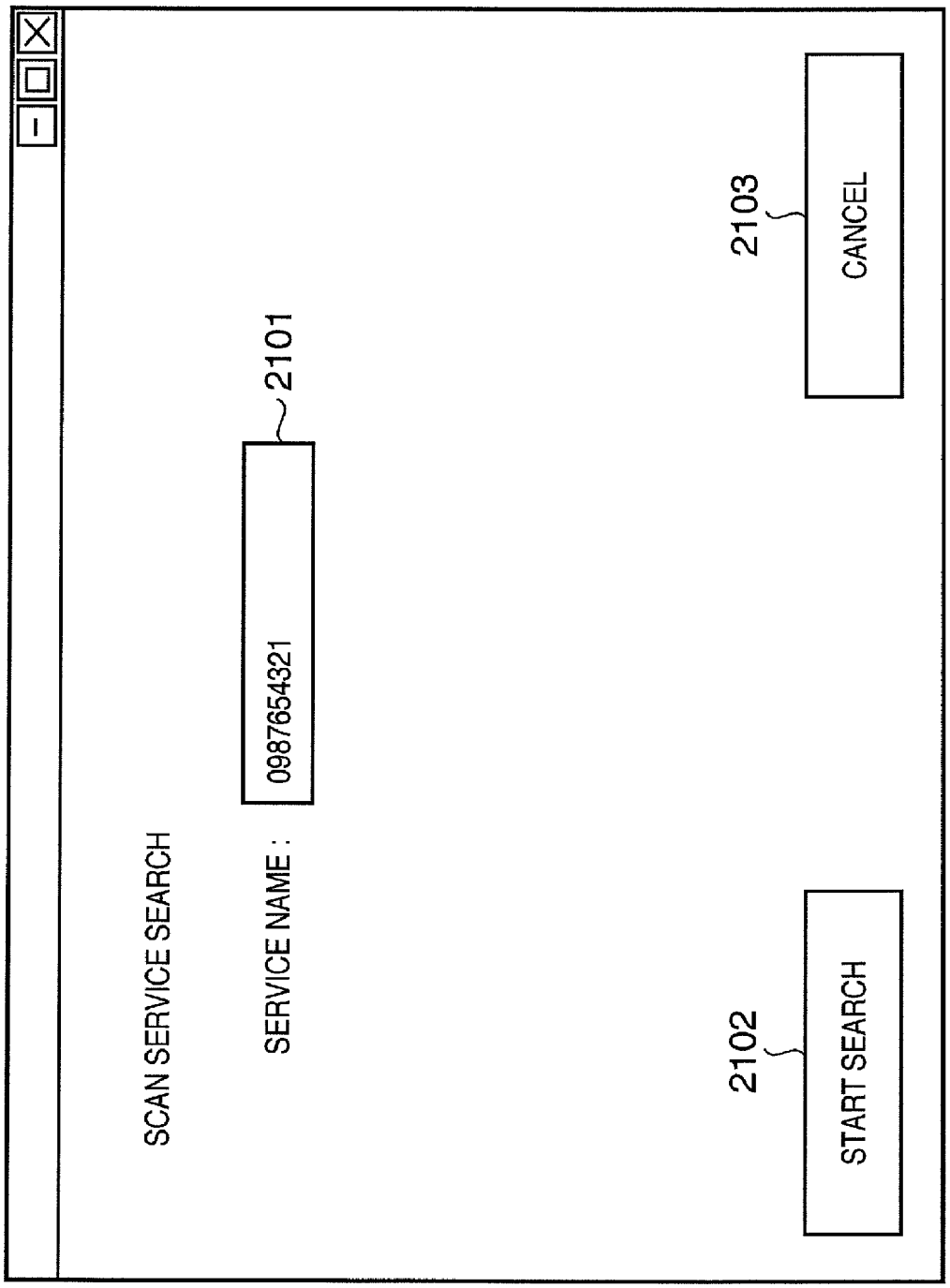
FIG. 21 is a view showing a display window example displayed when a storage service is launched on the PC in the second embodiment.

In the present embodiment, the service name remembered by the user and input in the window shown in FIG. 21 has been described as a onetime ID, but it is difficult for the user to remember a ten-digit number like "0987654321." Data which the user can more easily remember may be used as the service name remembered by the user and input in the window shown in FIG. 21, such as data generated part-way through the calculation of the onetime ID or data which serves as the basis for the calculation of the onetime ID. In this case, data generated part-way through the calculation of the onetime ID or data which serves as the basis for the calculation of the onetime ID is displayed as the service name in the window shown in FIG. 17. Further, as shown in step S1902 shown in FIG. 19, it is also possible for the multifunction device 101 to ultimately calculate the onetime ID based on a service name obtained from the PC 102, and judge whether this matches with the generated onetime ID. Further, no particular description is given of the validity period, but it may be made so as to be in advance by the user, or no validity period in particular may be set at all.

Scan Service Inquiry Reply Procedure Example

Figure 19:
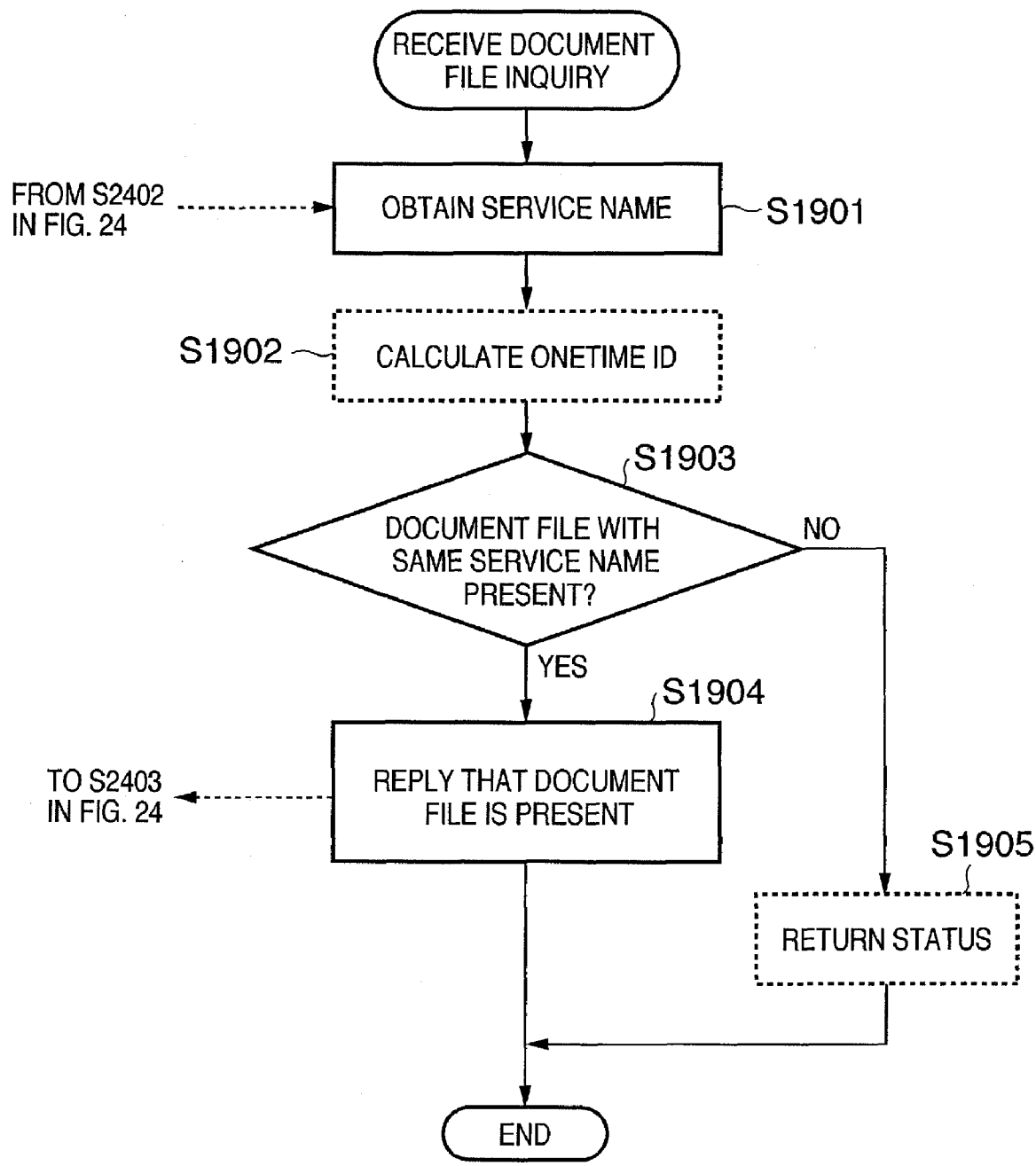
FIG. 19 is a flowchart showing an operation example of an inquiry to the scan service operating on the multifunction device in the second embodiment.

FIG. 19 is a flowchart showing a procedure example for replying after judging whether or not a scan service corresponding to the service name transmitted from the PC 102 is being executed by the multifunction device 101.

First, in step S1901, the CPU 802 obtains a service name from a received multicast search packet. If the service name to be entered in the window shown in FIG. 21 has been designed as the onetime ID itself, then the procedure moves to step S1903.

In step S1903, the CPU 802 compares the service name obtained in step S1901 and the onetime ID generated in step S1801. In other words, the CPU 802 searches for a document file handled by a scan service having the same service name as the service name obtained in step S1901. If a document file handled by a scan service with the same service name is found, the CPU 802 returns a search reply packet including information indicating that a document file exists and the service name (onetime ID) in step S1904. Moreover, an address (e.g., an IP address) in the network of the multifunction device 101 which is executing the scan service is included in the search reply packet. On the other hand, if no document file handled by a scan service with the same service name is found, the CPU 802 shuts down the service without a reply, or in step S1905 the CPU 802 may return status information indicating that the validity period has expired, etc.

If the service name input in the window shown in FIG. 21 is designed as the data generated during calculation of the onetime ID or as the data serving as the basis for calculation, then step S1902 is executed. In step S1902, the CPU 802 calculates a onetime ID based on the obtained service name and the onetime ID calculation algorithm 805c. In step S1903, the CPU 802 searches for a document file handled by the scan service for which the onetime ID calculated in step S1902 is the service name.

Operation Example of the PC of the Second Embodiment

PC Software Configuration Example

FIG. 20 is a block diagram showing a configuration example of software related to network storage services operating on the PC in the second embodiment. In FIG. 20, the PC 102 is described as an example. Note that modules performing the same function as in the first embodiment are given the same reference numerals.

2003 is a storage service controller, and is a software module for controlling all operations of storage services operating on the PC 102. 401 is a onetime ID generating unit, and a software module for generating a onetime ID as a temporary identifier when launching a storage service. The storage services of the present embodiment use the onetime ID generated by the onetime ID generating unit 401 or the onetime ID input by the user as service names. 402 is a window controller, and a software module for displaying various types of windows for controlling the storage services on the display of the display unit provided to the PC 102.

2004 is a document file search controller, and is a software module for designating search conditions and searching for document files handled by scan services. 405 is an operation controller. The operation controller 405 is a software module for analyzing various instructions from the client to a storage service, notifying the storage service controller 2003 of this, and returning a reply on instructions from the storage service controller 2003. The operation controller 405 is, for example, a module for analyzing file writing operations and file deleting operations from the client. 406 is a communication controller, and a software module for controlling the TCP/IP protocol, and governs control of TCP/IP communications between the client and the storage service.

PC Display Window Example

FIG. 21 is a view showing an example of a scan service search window displayed when a storage service running on the PC is launched in the second embodiment.

2101 is a field for inputting a service name as a search condition. In the example of FIG. 21, the user has input the "0987654321" displayed in the window shown in FIG. 17 as the service name.

2102 is a search start button, and when the user presses this button, the multifunction device 101 begins to search for a scan service on the network having the input service name 2101.

2103 is a cancel button, and the user presses this button when the user wishes to interrupt the search for a scan service.

Figure 23:
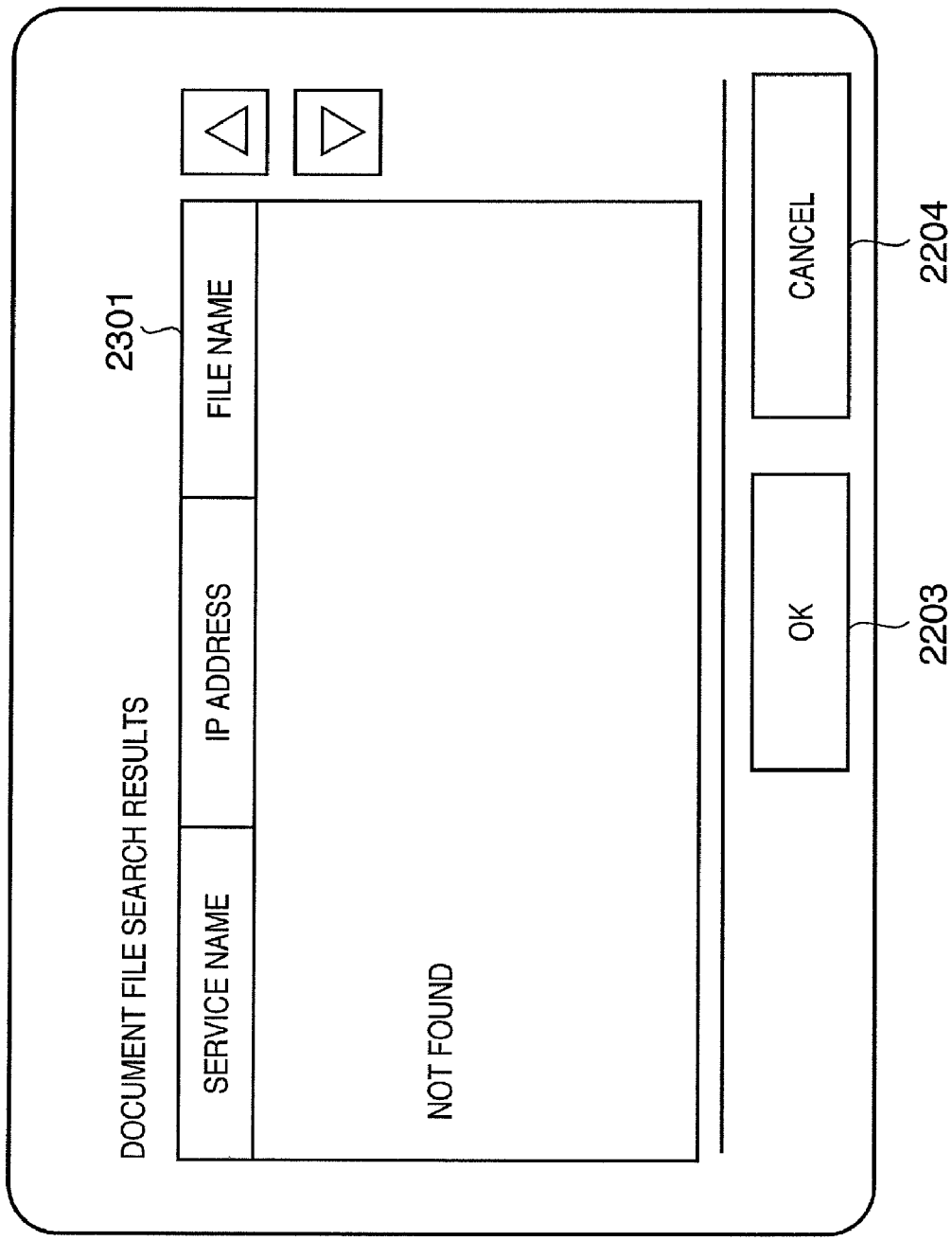
FIG. 23 is a view showing an example of a display window for scan service search results displayed to the display on the PC in the second embodiment.

FIG. 22 and FIG. 23 are views showing examples of a search results window for a document file handled by a scan service displayed to the display on the PC 102 in the second embodiment. FIG. 22 is an example when a document file handled by a scan service is found, and FIG. 23 is an example when no document file handled by a scan service is found.

FIG. 22 shows that a document file handled by one scan service with the service name "1234567890" was found by searching. In this case, the service name, IP address of the PC, and the file name are displayed in the document file search results 2201. By selecting the service displayed in the document file search results 2201 and pressing the OK button 2203, the user may thereafter perform file operations on this service such as reading and deleting files. Moreover, if a plurality of document files handled by scan services is found, the user selects the desired scan service with a selection button 2202 and then presses the OK button 2203. If no document data scanned to the scan service is read, or if it is finished, the user presses the cancel button 2204 to shutdown the service. FIG. 23 shows that no document file handled by a scan service was found by searching. In this case, the service name and the IP address are not displayed in the document file search results 2201, and "Not found," for example, is displayed.

Storage Service Control Example

Figure 24:
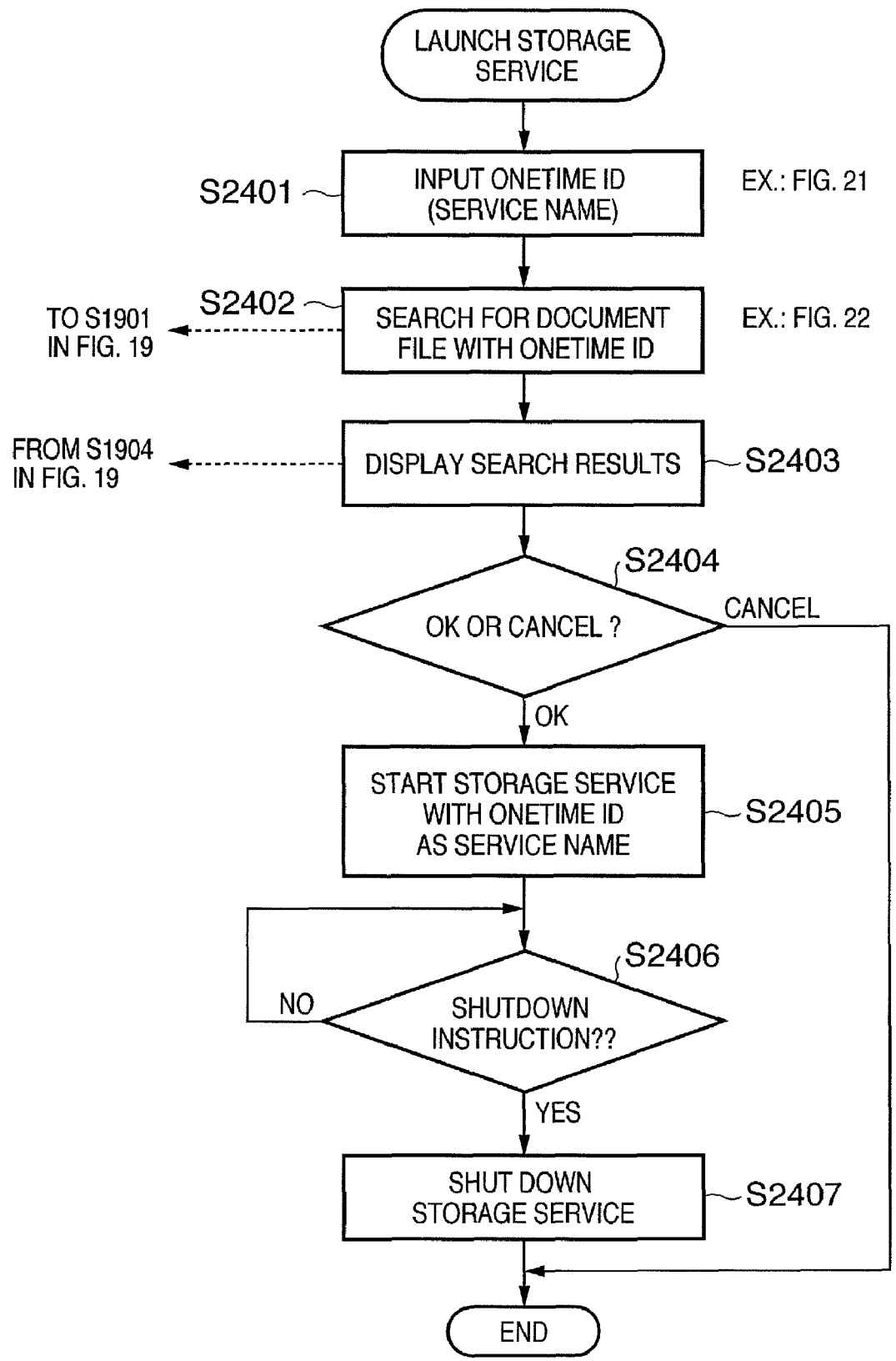
FIG. 24 is a flowchart showing an operation example from the launch to the shutdown of the storage service operating on the PC in the second embodiment.

FIG. 24 is a flowchart showing an operation procedure example from the launch to the shutdown of the storage service operating on the PC in the second embodiment. Note that this flowchart shows the procedure of a program for controlling the launch/shutdown of a storage service. The storage service itself is a sub-routine executed by referencing a launch instruction in step S2405 (registration to the storage service execution table 305a) and a shutdown instruction in step S2407 (deletion from the storage service execution table 305a).

When a storage service is launched, in step S2401 the CPU 302 displays the window shown in FIG. 21 and obtains the service name (onetime ID) input by the user. The CPU 302 obtains a keyword such as, for example, "0987654321." Next, in step S2402, the CPU 302 transmits a multicast search packet having this service name, and thereby searches for a document file handled by a scan service to which this service name was allocated at launch.

If there is a search reply packet, in step S2403 the CPU 302 obtains the service name and the IP address of the multifunction device from the search reply packet, and displays the search results shown in FIG. 22 to the display. If there is no search reply packet, the CPU 302 displays the search results shown in FIG. 23 to the display.

Next, in step S2404, the CPU 302 judges whether a service has been selected and the OK button 2203 has been pressed or the cancel button 2204 has been pressed. If the cancel button 2204 shown in FIG. 22 has been pressed, the CPU 302 shuts down the storage service. On the other hand, if a service has been selected and the OK button 2203 has been pressed, the procedure moves to step S2405. In step S2405, the CPU 302 performs the process for starting the storage service and access the document file handled by the selected scan service based on the IP address of the multifunction device on which the selected scan service is running. The CPU 302 performs file operations such as reading or deleting the file on the document file handled by the selected scan service. In order to identify the multifunction device on which the selected scan service is running, in the present embodiment address information such as an IP address is used, but other identification information identifying a multifunction device may be used. Other examples of such identification information are a URL (uniform resource locator) and a host name.

Thereafter, in step S2406, the CPU 302 judges whether or not the user has instructed to shut down. If the user has instructed to shut down, the CPU 302 performs a process to shut down the storage service in step S2407.

Other Examples of Service Names

Figure 25:
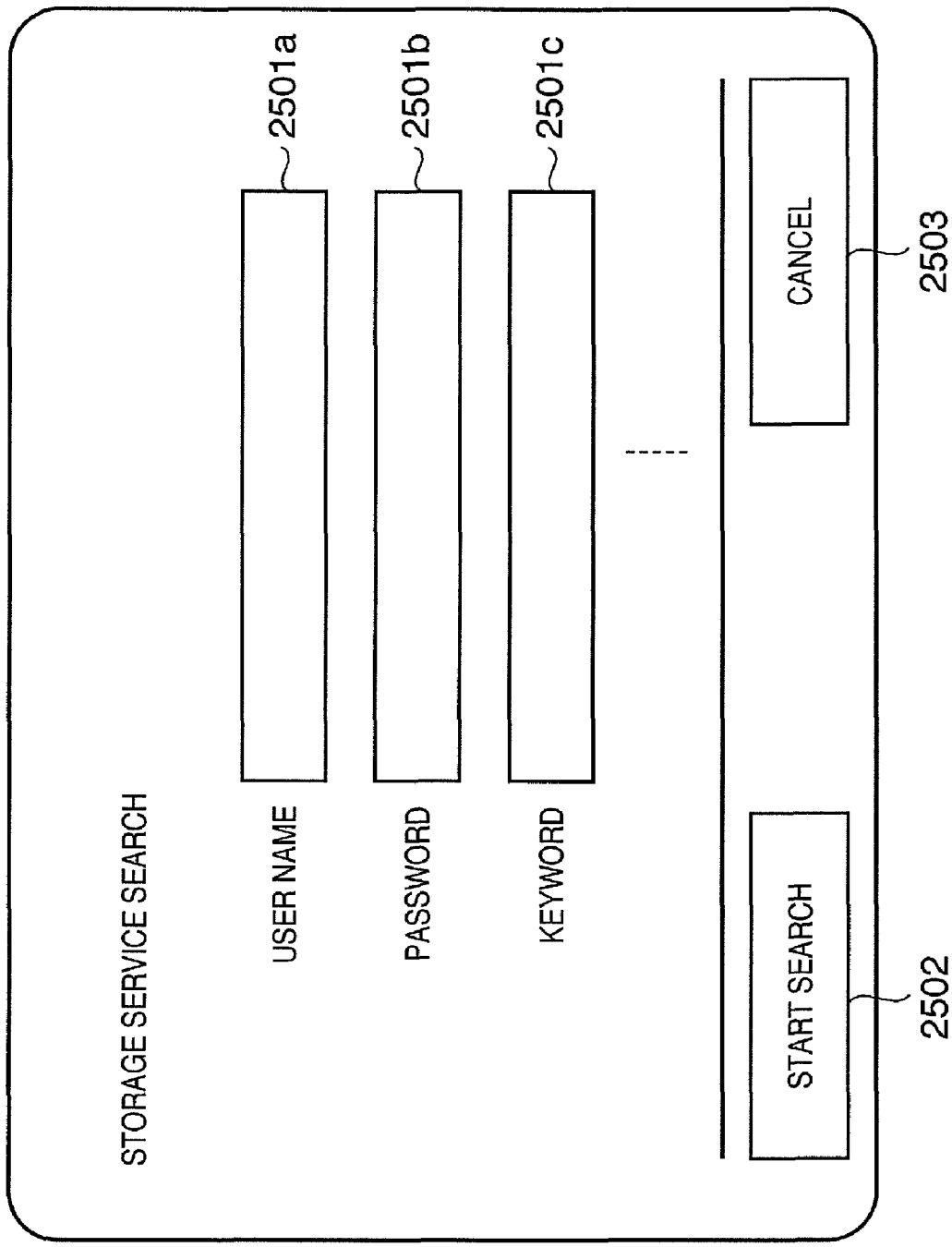
FIG. 25 is a figure showing an example of other service names in the present embodiment.

FIG. 25 shows an example of a service name which is not a calculated final onetime ID. FIG. 25 shows an example when searching for a storage service on a PC in the multifunction device 101 (equivalent to FIG. 11 of the first embodiment.) The service names set during other searches are the same, and are therefore not described here.

2501a is a user name input area, 2501b is a password input area, and 2501c is a keyword input area. This kind of input information (user name and password) is information which the user always remembers. The keyword may be, for example, the date, time, or place (department) of the launching of the storage service.

The PC receiving these service names calculates a onetime ID from these service names using a onetime ID calculation algorithm stored in the PC itself, and searches for a storage service with the same onetime ID allocated to it. Furthermore, if the launch time, etc. of launched storage services are stored and the input user name is made into even simpler information easier for the user to remember, greater reliability of searches for storage services (identification of PC on which they are launched) according to the present invention can be achieved.

Note that in the above description, the first embodiment and the second embodiment are described independently. However, by combining these controls, or by further varying them within the scope of the technological concept of the present invention, it is clear that data can similarly be transferred without mistakes from the transfer origin to the transfer destination with a simple operation, and this is also encompassed in the present invention.

Furthermore, the present invention may be applied to a system or comprehensive apparatus constituted from a plurality of devices (e.g., a host computer, interface device, printer, etc.) or to an apparatus constituted from a single device.

It will be appreciated that the object of the present invention can be achieved by supplying a storage medium (or recording medium) on which a program code is stored for software for realizing the functionality of the embodiments described above to a system or an apparatus. In this case, the program code read from the storage medium realizes the functionality of the embodiments described above, and the storage medium on which is stored the program code constitutes the present invention. Moreover, it will be appreciated that a case in which an operating system (OS), etc., performs all or part of the actual processes based on the instructions of the program code read by a computer and the functionality of the embodiments described above is thereby realized is also included.

The program code read from the storage medium is read into memory provided to a function enhancing card inserted into the computer or a function enhancing unit connected to the computer. It will be appreciated that a case in which a CPU, etc., provided to the function enhancing card or the function enhancing unit performs all or part of the actual processes based on the instructions of the program code and the functionality of the embodiments described above is thereby realized is also included.

When applying the present invention to the above storage medium, the program code corresponding to the flowchart described above is stored on that storage medium.

As described above, with the present invention, an information processing apparatus and a control method thereof, wherein a user can appropriately select a specific service and use that service via a network, is provided.

In other words, by using the temporarily generated identification information as the conditions for specifying the transfer origin and transfer destination of data, the service which is the object can be almost certainly implemented. Moreover, since the ability to specify the service with the identification information can be required to be within a prescribed time, it is possible to avoid illegal access from other malicious users, and security can be improved. Since this identification information is temporary, the possibility of being attacked later is low even if it is learned by another person.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese application No. 2006-026179 filed on Feb. 2, 2006, which is hereby incorporated by reference herein in its entirely.

What is claimed is:

1. An information processing apparatus for communicating with an external apparatus, comprising: an instructing unit configured to accept an instruction, from a user, for generating identification information to identify a service provided by the information processing apparatus from a service provided by other information processing apparatus;
   a generating unit configured to generate the identification information according to the instruction accepted by the instructing unit;
   a displaying unit configured to display the identification information generated by the generating unit;
   a receiving unit configured to receive, from the external apparatus, a search condition which is inputted at the external apparatus, to search the service provided by the information processing apparatus and transmitted by multicast;
   a judging unit configured to judge whether or not the search condition corresponds to the identification information displayed by the displaying unit; and
   a notifying unit configured to notify the external apparatus of address information indicating an address of the information processing apparatus if the judging unit judges that the search condition corresponds to the identification information displayed by the displaying unit;
   a stopping unit configured to stop the service provided by the information processing apparatus according to an instruction from a user, and a controlling unit configured to invalidate the identification information when the stopping unit stops the service provided by the information processing apparatus;

wherein the judging unit processes the search condition by a predetermined method and judges whether or not the search condition processed by the predetermined method corresponds to the identification information.

2. The information processing apparatus according to claim 1, wherein the identification information is different from the address information of the information processing apparatus.

3. The information processing apparatus according to claim 1, wherein the identification information is onetime ID.

4. The information processing apparatus according to claim 1, wherein the identification information is inputted in the external apparatus as the search condition.

5. The information processing apparatus according to claim 1, wherein the service provided by the information processing apparatus is a storage service for storing document files.

6. The information processing apparatus according to claim 1, wherein the service provided by the information processing apparatus is a scan service for reading document files.

7. The information processing apparatus according to claim 1, further comprising a controlling unit configured to invalidate the identification information when a predetermined period elapses.

8. The information processing apparatus according to claim 7, wherein the predetermined period is set by a user.

9. A control method for an information processing apparatus for communicating with an external apparatus, comprising:

an instructing step of accepting an instruction, from a user, for generating identification information to identify a service provided by the information processing apparatus from a service provided by other information processing apparatus;

a generating step of generating the identification information according to the instruction accepted by the instructing step;

a displaying step of displaying the identification information generated by the generating step;

a receiving step of receiving, from the external apparatus, a search condition which is inputted at the external apparatus, to search the service provided by the information processing apparatus and transmitted by multicast;

a judging step of judging whether or not the search condition corresponds to the identification information displayed by the displaying step; and a notifying step of notifying the external apparatus of address information indicating an address of the information processing apparatus if it is judged in the judging step that the search condition corresponds to the identification information displayed by the displaying step;

a stopping step to stop the service provided by the information processing apparatus according to an instruction from a user, and a controlling step to invalidate the identification information when the stopping step stops the service provided by the information processing apparatus;

wherein the judging step processes the search condition by a predetermined method and judges whether or not the search condition processed by the predetermined method corresponds to the identification information.

10. A non-transitory computer-readable medium storing a program for causing computer to execute a control method for an information processing apparatus for communicating with an external apparatus, the program causing the computer to execute:

an instructing step of accepting an instruction for generating identification information to identify a service provided by the information processing apparatus from a service provided by other information processing apparatus from a user;

a generating step of generating the identification information according to the instruction accepted by the instructing step;

a displaying step of displaying the identification information generated by the generating step;

a receiving step of receiving, from the external apparatus, a search condition which is inputted at the external apparatus, to search the service provided by the information processing apparatus from the external apparatus and transmitted by multicast;

a judging step of judging whether or not the search condition corresponds to the identification information displayed by the displaying step; and a notifying step of notifying the external apparatus of address information indicating an address of the information processing apparatus if it is judged in the judging step that the search condition corresponds to the identification information displayed by the displaying step;

a stopping step to stop the service provided by the information processing apparatus according to an instruction from a user, and a controlling step to invalidate the identification information when the stopping step stops the service provided by the information processing apparatus;

wherein the judging step processes the search condition by a predetermined method and judges whether or not the search condition processed by the predetermined method corresponds to the identification information.

11. An information processing apparatus for communicating with a multifunction device, comprising:

an instructing unit configured to accept an instruction, from a user, for generating identification information to identify a service provided by the information processing apparatus from a service provided by other information processing apparatus;

a generating unit configured to generate the identification information according to the instruction accepted by the instructing unit;

a displaying unit configured to display the identification information generated by the generating unit;

a receiving unit configured to receive, from the multifunction device, a search condition which is inputted at the multifunction device, to search the service provided by the information processing apparatus and transmitted by multicast;

a judging unit configured to judge whether or not the search condition corresponds to the identification information displayed by the displaying unit; and a notifying unit configured to notify the multifunction device of address information indicating an address of the information processing apparatus if the judging unit judges that the search condition corresponds to the identification information displayed by the displaying unit, wherein the service provided by the information processing apparatus is a storage service for storing document files;

a stopping step to stop the service provided by the information processing apparatus according to an instruction from a user, and a controlling step to invalidate the identification information when the stopping step stops the service provided by the information processing apparatus;

wherein the judging step processes the search condition by a predetermined method and judges whether or not the search condition processed by the predetermined method corresponds to the identification information.

12. A control method for an information processing apparatus for communicating with a multifunction device, comprising:
- an instructing step of accepting an instruction, from a user, for generating identification information to identify a service provided by the information processing apparatus from a service provided by another information processing apparatus;
- a generating step of generating the identification information according to the instruction accepted by the instructing step;
- a displaying step of displaying the identification information generated by the generating step;
- a receiving step of receiving, from the multifunction device, a search condition which is inputted at the multifunction device, to search the service provided by the information processing apparatus and transmitted by multicast;
- a judging step of judging whether or not the search condition corresponds to the identification information displayed by the displaying step; and
- a notifying step of notifying the multifunction device of address information indicating an address of the information processing apparatus if the judging step judges that the search condition corresponds to the identification information displayed by the displaying step,
- wherein the service provided by the information processing apparatus is a storage service for storing document files;
- a stopping step to stop the service provided by the information processing apparatus according to an instruction from a user, and a controlling step to invalidate the identification information when the stopping step stops the service provided by the information processing apparatus;
- wherein the judging step processes the search condition by a predetermined method and judges whether or not the search condition processed by the predetermined method corresponds to the identification information.

13. A non-transitory computer-readable medium storing a program that, when executed by a computer, causes the computer to perform a control method for an information processing apparatus for communicating with a multifunction device, the method comprising:
- an instructing step of accepting an instruction, from a user, for generating identification information to identify a service provided by the information processing apparatus from a service provided by another information processing apparatus;
- a generating step of generating the identification information according to the instruction accepted by the instructing step;
- a displaying step of displaying the identification information generated by the generating step;
- a receiving step of receiving, from the multifunction device, a search condition which is inputted at the multifunction device, to search the service provided by the information processing apparatus and transmitted by multicast;
- a judging step of judging whether or not the search condition corresponds to the identification information displayed by the displaying step; and
- a notifying step of notifying the multifunction device of address information indicating an address of the information processing apparatus if the judging step judges that the search condition corresponds to the identification information displayed by the displaying step,
- wherein the service provided by the information processing apparatus is a storage service for storing document files;
- a stopping step to stop the service provided by the information processing apparatus according to an instruction from a user, and a controlling step to invalidate the identification information when the stopping step stops the service provided by the information processing apparatus;
- wherein the judging step processes the search condition by a predetermined method and judges whether or not the search condition processed by the predetermined method corresponds to the identification information.

* * * * *